United States Patent
Souche et al.

(10) Patent No.: US 10,210,178 B2
(45) Date of Patent: Feb. 19, 2019

(54) MACHINE LEARNING IMAGE PROCESSING

(71) Applicant: ACCENTURE GLOBAL SOLUTIONS LIMITED, Dublin (IE)

(72) Inventors: Christian Souche, Cannes (FR); Junmin Yang, Antibes (FR); Alexandre Naressi, Valbonne (FR)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 145 days.

(21) Appl. No.: 15/477,684

(22) Filed: Apr. 3, 2017

(65) Prior Publication Data

US 2018/0012110 A1 Jan. 11, 2018

(30) Foreign Application Priority Data

Jul. 6, 2016 (EP) .................................... 16290130
Mar. 10, 2017 (EP) .................................... 17290038

(51) Int. Cl.
| | |
|---|---|
| G06K 9/00 | (2006.01) |
| G06F 17/30 | (2006.01) |
| G06N 3/04 | (2006.01) |
| G06K 9/46 | (2006.01) |
| G06K 9/62 | (2006.01) |

(52) U.S. Cl.
CPC .. *G06F 17/30244* (2013.01); *G06F 17/30247* (2013.01); *G06F 17/30265* (2013.01); *G06F 17/30271* (2013.01); *G06K 9/00671* (2013.01); *G06K 9/00362* (2013.01); *G06K 9/4628* (2013.01); *G06K 9/627* (2013.01); *G06N 3/0454* (2013.01); *G06N 3/0481* (2013.01)

(58) Field of Classification Search
None
See application file for complete search history.

(56) References Cited

U.S. PATENT DOCUMENTS 8,473,586 B2   6/2013   Kronik et al.
9,230,266 B2   1/2016   Bentley
(Continued)

FOREIGN PATENT DOCUMENTS

CN          105447529 A       3/2016

OTHER PUBLICATIONS

Zhengzhong Zhou et al, "Demand-adaptive Clothing Image Retrieval Using Hybrid Topic Model", Proceedings of the 2016 ACM on Multimedia Conference, MM '16, New York, New York, USA, (Oct. 15, 2016), pp. 496-500.

(Continued)

*Primary Examiner* — Justin P. Misleh
(74) *Attorney, Agent, or Firm* — Mannava & Kang, P.C.

(57) ABSTRACT

A machine learning image processing system performs natural language processing (NLP) and auto-tagging for an image matching process. The system facilitates an interactive process, e.g., through a mobile application, to obtain an image and supplemental user input from a user to execute an image search. The supplemental user input may be provided from a user as speech or text, and NLP is performed on the supplemental user input to determine user intent and additional search attributes for the image search. Using the user intent and the additional search attributes, the system performs image matching on stored images that are tagged with attributes through an auto-tagging process.

20 Claims, 16 Drawing Sheets

(56) References Cited

U.S. PATENT DOCUMENTS

| | | | |
|---|---|---|---|
| 2003/0063779 | A1 | 4/2003 | Wrigley |
| 2007/0288453 | A1* | 12/2007 | Podilchuk ......... G06F 17/30259 |
| 2014/0136314 | A1 | 5/2014 | Kiet et al. |
| 2015/0213058 | A1* | 7/2015 | Ambardekar ...... G06K 9/00671 707/706 |
| 2017/0097948 | A1* | 4/2017 | Kerr ...................... G06F 3/0482 |
| 2017/0098152 | A1* | 4/2017 | Kerr ................... G06F 3/04842 |

OTHER PUBLICATIONS

Zhengzhong Zhou et al, "Interactive Image Search for Clothing Recommendation", Proceedings of the 2016 ACM on Multimedia Conference, MM '16, New York, New York, USA, (Oct. 15, 2016), pp. 754-756.

Kevin Lin et al, "Rapid Clothing Retrieval via Deep Learning of Binary Codes and Hierarchical Search", Proceedings of the 5th ACM on International Conference on Multimedia Retrieval, ICMR '15, New York, New York, USA, (Jun. 23, 2015), pp. 499-502.

Kevin Lin et al., "Deep Learning of Binary Hash Codes for Fast Image Retrieval", Academia Sinica, Taiwan, 2015, 9 pages.

Stephanie Bertoline, "Facebook Dynamic Product Ads", Oct. 15, 2015. 6 pages. Retrieved from Internet on Feb. 26, 2016. <http://thiisglow.com/blog/facebook-dynamic-product-ads.html>.

Nanigans, "The Essential Guide to_Driving ROI with Facebook Dynamic Product Ads", Sep. 2015, 10 pages.

Ross Girshick, "Fast R-CNN", Microsoft Research, ICCV 2015, 9 pages.

Ginny Marvin, "Google Rolls Out Adwords Dynamic Retargeting for Retailers", Jun. 24, 2013, 4 pages.

"AdRoll—How Retargeting Works", published date unknown, 5 pages. Retrieved from Internet on Apr. 10, 2017. <https//www.adroll.com/getting-started/retargeting>.

"What is Dynamic Retargeting? Perfect Audience Retargeting Resources", Perfect Audience, A Marin Software Company, published date unknown, 2 pages. Retrieved from Internet on Apr. 10, 2017 <http://support.perfectaudience.com/knowledgebase/articles/306373-What-is-Dynamic-Retargeting>.

Philip Fogleman, "Display Advertising Solutions for Every Stage in Customer Lifecycle", ReTargeter, published date unknown, 3 pages. Retrieved from Internet on Apr. 10, 2017. <https://retargeter.com/>.

Mike Sperling, "Retargeting Previous Website Visitors", The Enterprise Center, Mar. 10, 2015, 2 pages. Retrieved from <http://enterprisectr.org/retargeting-previous-website-visitors/>.

Yushi Jing et al., "Visual Search at Pinterest", Visual Discovery, Pinterest, University of California, Kerkeley, Oct. 13, 2015, 10 pages.

Junshi Huang et al. "Deep Search with Attribute-aware Deep Network", Multimedia, ACM, New York, NY 10121, Nov. 3, 2014, pp. 731-732.

Brian Lao et al., "Convolutional Neural Networks for Fashion Classification and Object Detection", CS231n Course Project Report (Winter Quarter 2015), Jan. 1, 2015, Stanford University.

Liu Ziwei et al., "Deep Learning Face Attributes in the Wild", 2015 IEEE International Conference on Computer Vision (ICCV), IEEE, Dec. 7, 2015, pp. 3730-3738.

* cited by examiner

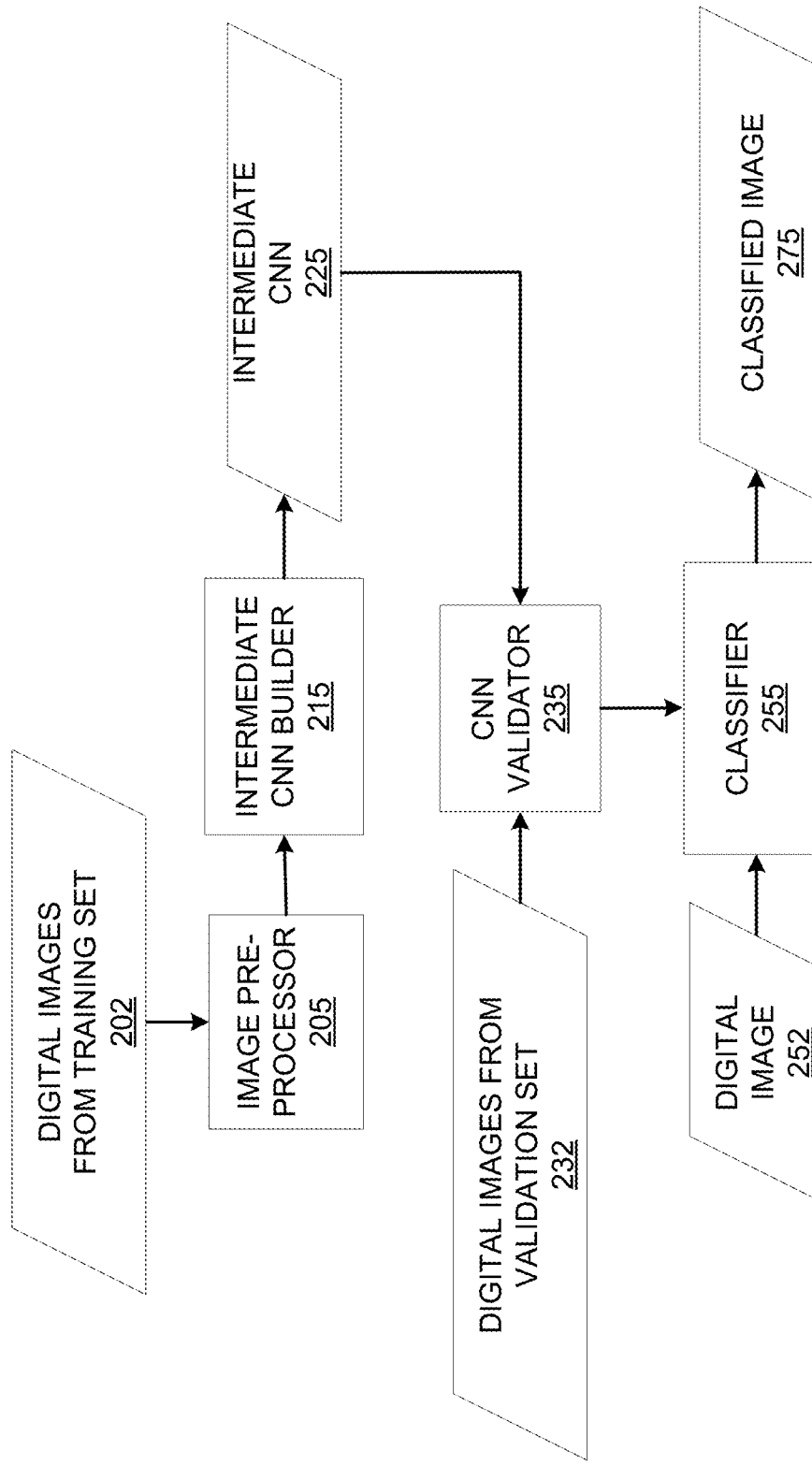

MACHINE LEARNING IMAGE PROCESSING

PRIORITY

The present application claims foreign priority under 35 USC 119(a)-(d) to European patent application 16290130.0, filed Jul. 6, 2016, and to European patent application 17290038.3, filed Mar. 10, 2017, both of which are incorporated by reference in their entireties.

BACKGROUND

Digital image processing typically involves processing a digital image, for example, from a digital still image or digital video, to ascertain, detect, and/or classify particular features or objects in the image. Pattern recognition may be applied during the image processing to detect a particular object in the image. Digital image processing with pattern recognition has been used in a wide variety of applications, such as facial recognition, detection of land features from aerial photographs, vehicle license plate determination, etc. Different types of conventional machine learning functions may be used for pattern recognition.

BRIEF DESCRIPTION OF THE DRAWINGS

Features of the present disclosure are illustrated by way of example and not limited in the following figure(s), in which like numerals indicate like elements, in which:

FIG. 2 shows training a classifier, according to an example of the present disclosure;

DETAILED DESCRIPTION

Figure 1:
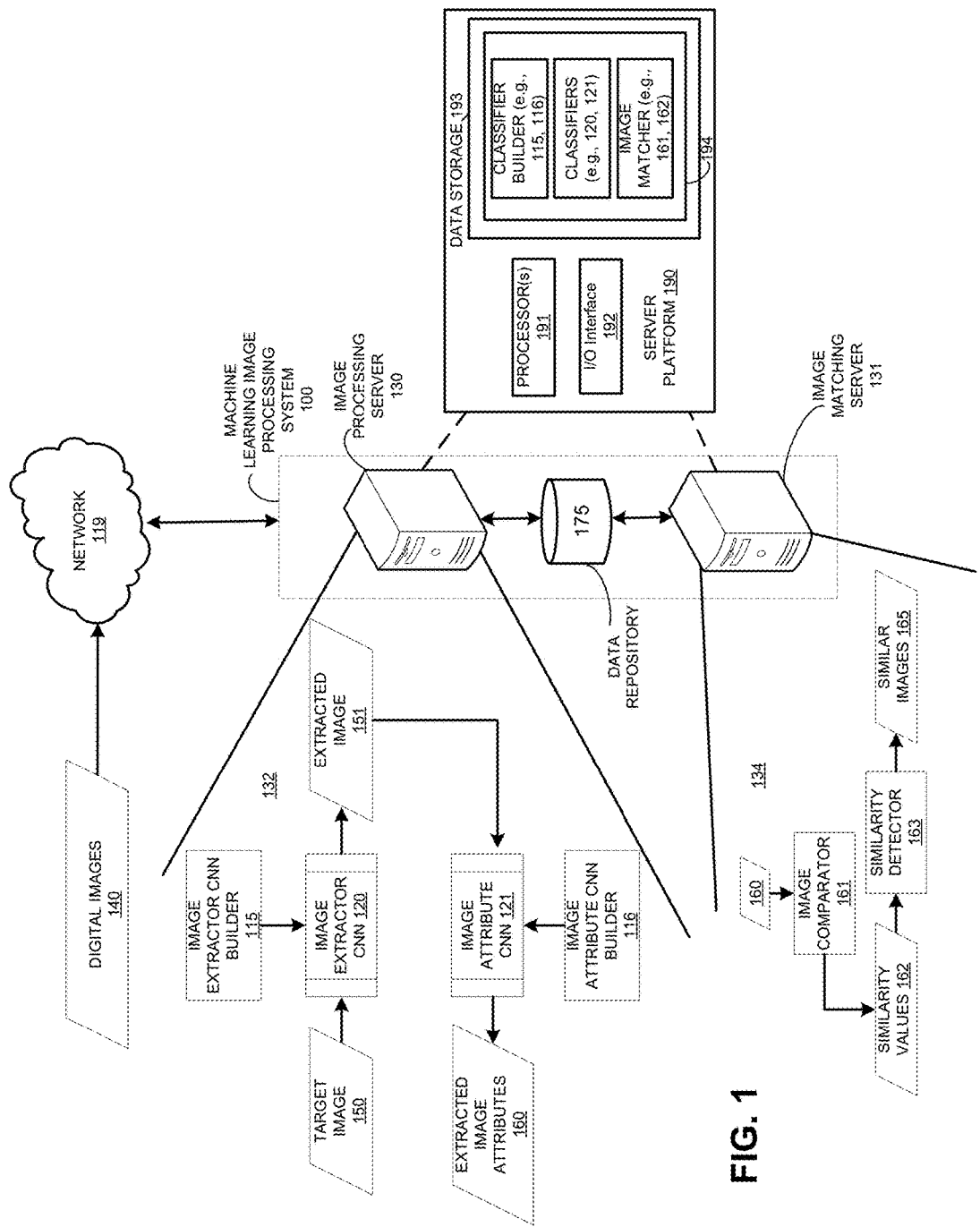
FIG. 1 shows a system diagram of an image processing system, according to an example of the present disclosure.

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures readily understood by one of ordinary skill in the art have not been described in detail so as not to unnecessarily obscure the present disclosure. As used herein, the terms "a" and "an" are intended to denote at least one of a particular element, the term "includes" means includes but not limited to, the term "including" means including but not limited to, and the term "based on" means based at least in part on.

A machine learning image processing system, according to an example of the present disclosure, builds and trains multiple machine learning classifiers, such as convolutional neural networks (CNNs). The machine learning classifiers may accurately and automatically extract images and perform image processing to detect particular attributes of the extracted images. The attributes may be used for image matching to identify visually similar content.

CNNs include many layers to detect and classify particular features of images relevant for a problem in hand. Furthermore, each layer of the CNN typically has a multitude of parameters associated with it. The specific values of those parameters necessary for a successful and accurate image classification may not be known a priori. The machine learning image processing system, according to an embodiment, provides a method for building and training CNNs to output an accurate classification of an image.

Multiple CNNs may be built and trained by the machine learning image processing system. According to an example of the present disclosure, a first CNN built and trained by the machine learning image processing system may be an image extraction CNN. The image extraction CNN is trained to identify objects from a target image for extraction. The target image is any image that is provided to the image extraction CNN to identify and extract an image of an object therefrom. The extracted image may include a portion of the target image containing an object from the target image. An object in an image is anything that is captured in the image. For example, a target image may include multiple people and/or multiple physical items (e.g., vehicles, street signs, clothes, bags, or any tangible item), and each person or item in the image is an object. The machine learning image processing system may identify objects in the target image, and crop one or more of the objects from the target image to create extracted images of the objects.

Another CNN built and trained by the machine learning image processing system may include an image attribute CNN. The image attribute CNN determines attributes of an image. In an example, an extracted image is created using the image extraction CNN, and the image attribute CNN determines attributes of the extracted image. The attributes of the extracted image may be compared to attributes of stored images to find similar images in an image matching process. The attributes are high-level abstractions represented by vectors of numeric values that may include visual features of an image.

The examples of the present disclosure are generally associated with digital image processing using machine learning. A technical problem associated with pattern recognition and other types of image processing is how to identify an object from an image. The image extraction CNN described in further detail below is able to accurately and automatically extract an image of an object from a target image. Another technical problem associated with image processing is accurate image matching. The image attribute CNN is able to identify particular attributes of the target image which may be used for image matching. Furthermore, both the image extraction CNN and the image attribute CNN can operate in real-time to facilitate accurate image matching of objects from a target image.

With reference to FIG. 1, there is shown a system diagram of a machine learning image processing system 100, according to an example of the present disclosure. The system 100 is referred to as machine learning because it may use machine learning functions to generate classifiers to make predictions on images. Examples of classifiers that may be created and used in the system 100 are CNNs, as is further discussed below. It should be understood that the system 100 may include additional components and that one or more of the components described herein may be removed and/or modified without departing from a scope of the system 100. The system 100 may include an image processing server 130, an image matching server 131 and a data repository 175.

The system 100 may receive digital images 140, and the digital images 140 may be stored in the data repository 175. The digital images 140 may be received via communications network 119. The digital images 140 may be provided in files, e.g., JPG, GIF, TIFF, PNG, or BMP files. The digital images 140 may be provided in digital video and generated from one or more frames of digital video. The digital images 140 may be provided by any number of sources.

The communications network 119 may include local area networks (LANs) and wide area networks (WANs), such as the Internet. The communications network 119 may include signal bearing mediums that may be controlled by software, applications and/or logic. The communications network 119 may include a combination of network elements to support data communication services. The communications network 119 may encompass wired and/or wireless network technologies.

Examples of operations performed by the image processing server 130 are shown at 132. For example, the image processing server 130 may include an image extractor CNN builder 115 that builds image extractor CNN 120. Test data sets and validation sets may be created, for example, from the digital images 140 or other digital images, and may be used to build and validate the image extractor CNN 120. Building and validating the image extractor CNN 120 is further described with respect to FIGS. 2 and 3A. The image extractor CNN 120, for example, is trained to identify classes (i.e., categories) of objects in digital images and locations of the objects in the digital images. The training data for the image extractor CNN 120 may include digital images, each having one or more objects, a class for each object, and a bounding box (e.g., size and location of bounding box) identifying the location of each object in the digital image.

After building the image extractor CNN 120, the image extractor CNN 120 may be used to identify objects in digital images. Target image 150 is a digital image provided as input to the image extractor CNN 120, and the image extractor CNN 120 makes a prediction as to whether the target image 150 contains an object in one of the classes for which it was trained. If the image extractor CNN 120 generates a prediction that indicates the target image 150 contains an object in one of the classes, the image extractor CNN 120 identifies a bounding box in the target image 150 that surrounds the object. The target image 150 may be cropped around the bounding box, and the resulting image may be saved as the extracted image 151.

An image attribute CNN builder 116 builds image attribute CNN 121. Test data sets and validation sets may be created, for example, from the digital images 140 or other digital images, and may be used to build and validate the image attribute CNN 121. Building and validating the image attribute CNN 121 is further described with respect to FIGS. 2 and 4A. The image attribute CNN 121, for example, is trained to identify classes (i.e., categories) of digital images.

After building the image attribute CNN 121, the image attribute CNN 121 may be used to determine attributes of images classified by the image attribute CNN 121. For example, the extracted image 151 is provided as input to the image attribute CNN 121. The image attribute CNN 121 generates a prediction of whether the extracted image 151 is in a class for which it was trained. However, instead of using the prediction generated by the image attribute CNN 121, the image processing server 130 determines attributes (shown as extracted image attributes 160) of the extracted image 151 determined by an intermediate layer of the image attribute CNN 121 during its analysis of the extracted image 151 to generate the prediction. For example, the image attribute CNN 121 may be comprised of multiple convolutional layers, fully connected layers, and a binarized sigmoidal layer. A fully connected layer computes the output as $Y=FC(X)=W*X+B$, where X is the output of the previous layer, a matrix of m*1 values; W is the weight parameter of the layer, a matrix of n*m values; B is the bias parameter of the layer, a matrix of n*1 values; and Y is the output of the fully connected layer, a matrix of n*1 values. This output is the input of the following RELU layer: $y=RELU(x)=0$ if $x<0$; $y=RELU(x)=x$ if $x>=0$, where each element of the matrix X is referred to as an element x. The output of the RELU layer is a matrix of the same dimension as the input, e.g., a matrix of n*1 values in the range of $[0,+\infty)$. The output of the RELU layer is the input of the binarized sigmoidal layer, which may generate a value of 0 or 1 for each attribute of multiple attributes of the extracted image. The sigmoidal layer computes the output as $sigmoid(x)=1/(1+exp(-x))$ for each input element x. The input element x may include values determined from a matrix that is output from a previous layer of the image CNN 121, for example the RELU layer explained above. The output value of the sigmoidal layer is a matrix of n*1 values in the range of (0,1). The output matrix is then binarized by applying a threshold: $y=0$ if $x<threshold$; $y=1$ if $x>=threshold$. The extracted image attributes 160 may include the values for the attributes determined by the sigmoidal layer of the image attribute CNN 121. The extracted image attributes 160 may be stored in the data repository 175 and may be used by the image matching server 131 to identify similar images, as is further described below.

Examples of operations performed by the image matching server 131 are shown at 134. The image matching server 131 can compare the extracted image 151 to other images to identify images that are similar to the extracted image 151. Attributes of the images may be compared to determine how similar the images are to each other. The images being compared to the extracted image 151 and/or image data for those images, including their attributes, may be stored in the data repository 175. The image matching server 131 may include an image comparator 161 that compares the extracted image attributes 160 to image attributes of other images, for example, stored in the data repository 175, to identify similar images. The output of the image comparator 161 may include similarity values 162 that represent an amount of similarity between the extracted image attributes 160 and the attributes of other images being compared to the extracted image 151. In an example, to determine similarity between the extracted image attributes 160 and attributes of another image, a Hamming distance may be calculated. The Hamming distance is an example of a similarity value of the similarity values 162. A similarity detector 163 determines from the similarity values 162 a set of one or similar images 165 that are visually similar to the extracted image 151. For example, images associated with the "n" smallest Hamming distances are identified as images visually similar to the extracted image 151, where "n" is an integer greater than or equal to 1. Determining the similar images 165 that are the most similar to the extracted image 151 may be used for a variety of applications, such as for facial recognition, vehicle detection, license plate detection, content delivery, etc. In another example, similar images but not exact images are identified by the image matching server 131, as is further discussed below.

Server platform 190 is an example of hardware that may be used in the image processing server 130, image matching server 131 or other servers described herein. It should be understood that the server platform 190 may include additional components and that one or more of the components described herein may be removed and/or modified as is known to one of ordinary skill in the art.

The server platform 190 may include one or more processors 191, data storage 193, and an input/output (I/O) interface 192. The components of the server platform 190 are shown on a single computer or server as an example and in other examples the components may exist on multiple computers or servers. The server platform 190 may store data in the data storage 193 and/or may manage the storage of data stored in a separate computing device, for instance, through the I/O interface 192. The data storage 193 may include physical memory, a hard drive, an optical drive, a flash drive, an array of drives, or any combinations thereof, and may include volatile and/or non-volatile data storage.

The processor 191, which may comprise a microprocessor, a micro-controller, an application specific integrated circuit (ASIC), Graphical Processing Unit (GPU) or the like, is to perform various processing functions of the respective server. The processing functions may include classifier building functions, such as performed by image extractor CNN builder 115 and image attribute CNN builder 116, image matching functions, such as performed by the image comparator 161 and the similarity detector 163, and other functions. The processing functions performed by the image processing server 130 and the image matching server 131, and other functions, operations and methods described herein may be embodied as machine readable instructions 194 that are stored in a non-transitory computer readable medium, such as the data storage 193, and executed by a processor, such as processor 191. In addition to storing the machine readable instructions 194, the data storage 193 may store data or functions, such as classifiers which may include image extractor CNN 120 and image attribute CNN 121. The image processing server 130 and the image matching server 131 are shown as separate servers. However, the functions and operations of these servers may be performed on a single server or multiple servers which may be connected via a network.

The I/O interface 192 includes a hardware and/or a software interface. The I/O interface 192 may be a network interface connected to a network through a network device, such as a router. For example, the I/O interface 192 may be a wireless local area network (WLAN) or a network interface controller (NIC). The WLAN may link to the network device through a radio signal. Similarly, the NIC may link to a network device through a physical connection, such as a cable.

The data repository 175 may include a database comprised of database tables or another type of data storage system. The data repository 175 can be implemented as a standalone or distributed repository.

FIG. 2 shows an example of operations for generating classifiers 255, which may include operations performed by the image extractor CNN builder 115 and the image attribute CNN builder 116 to build the image extractor CNN 120 and the image attribute CNN 121. The training sets may include supervised training sets that include labeled data objects, which are used to train the CNNs to generate the classifiers 255, such as the image extractor CNN 120 and the image attribute CNN 121. The image processing server 130, for example, may receive digital images 202 from a labeled training set at an image pre-processor 205. The image pre-processor may crop and enhance particular content in the images from the training set to input into intermediate CNN builder 215. The intermediate CNN builder 215 may select various architectures and parameters to train an intermediate CNN 225. The intermediate CNN 225 may be then be evaluated on digital images 232 in a validation set. CNN validator 235 may determine whether to flag the intermediate CNN 225 as meeting a designated validation threshold. If the intermediate CNN 225 does not meet the validation threshold, the intermediate CNN 225 is not flagged and continues to be trained on the digital images 202 from the training set by the intermediate CNN builder 215. Shared weights of the CNN may be adjusted in an iterative process until the validation threshold is met. When the intermediate CNN 225 meets the validation threshold, the intermediate CNN 225 may be selected as the classifier 255. The classifier 255 may be used to classify digital images, such as digital image 252, into a class or category at 275. The classification may be a prediction of whether the digital image belongs to the class or category. The prediction may be accompanied by a confidence value that indicates accuracy of the classification.

Figure 3A:
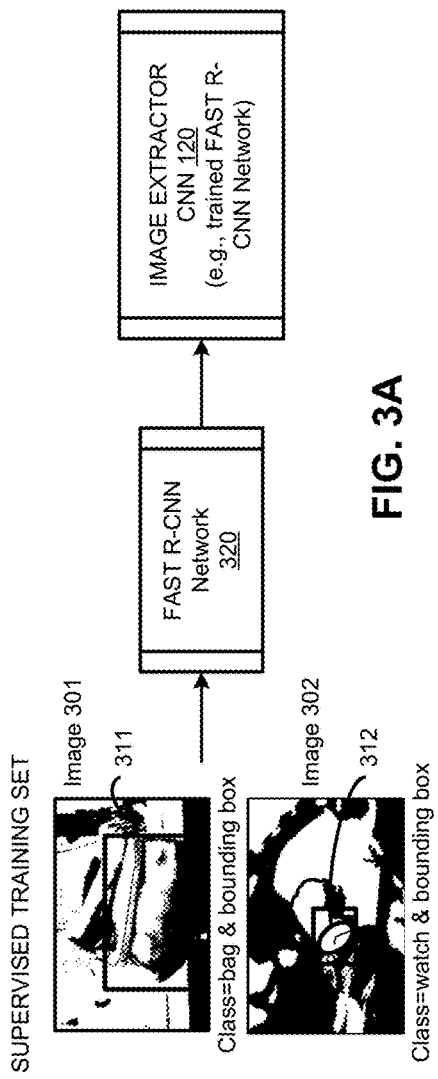
FIGS. 3A-B show an image extractor convolutional neural network, according to examples of the present disclosure.

FIG. 3A shows an example of building and training the image extractor CNN 120. The image extractor CNN 120 may be a Fast Region Based Convolution Network (Fast R-CNN). One or more training sets are provided as input to a Fast R-CNN 320 to train the Fast R-CNN 320 to create the image extractor CNN 120. The Fast R-CNN 320 is trained to identify classes of objects in images. For example, the classes of objects to be identified by the image extractor CNN 120 are determined. One or more training sets are created that include images with objects in the classes. The training sets may include supervised training sets that include labeled data objects. For example, the following classes c1-c7 are determined for the training sets: c1=bags, c2=shoes, c3=watches, c4=dresses, c5=shirts, c6=sunglasses, and c7=skirt. Images with objects including bags, shoes, watches, dresses, shirts, sunglasses, and skirts are identified and included in the training sets. Also, locations of the objects in the images are determined. For each image, the classes of the one or more objects in the images, and the location of each object are specified to create the supervised training sets. Images 301 and 302 are shown for the supervised training set. An object in image 301 is a bag, and a location and size of bounding box 311 is specified to identify the location of the bag in the image 301. An object in image 302 is a watch, and a location and size of bounding box 312 is specified to identify the location of the watch in the image 302. The supervised training set may include images with objects in all the classes to train the Fast R-CNN 320 to create the image extractor CNN 120. Multiple CNNs may be created. For example, a CNN 120 may be created for each of the classes c1-c7. Accordingly, the image extractor CNN 120 may comprise multiple CNNs, each trained for a particular class of objects.

Figure 3B:
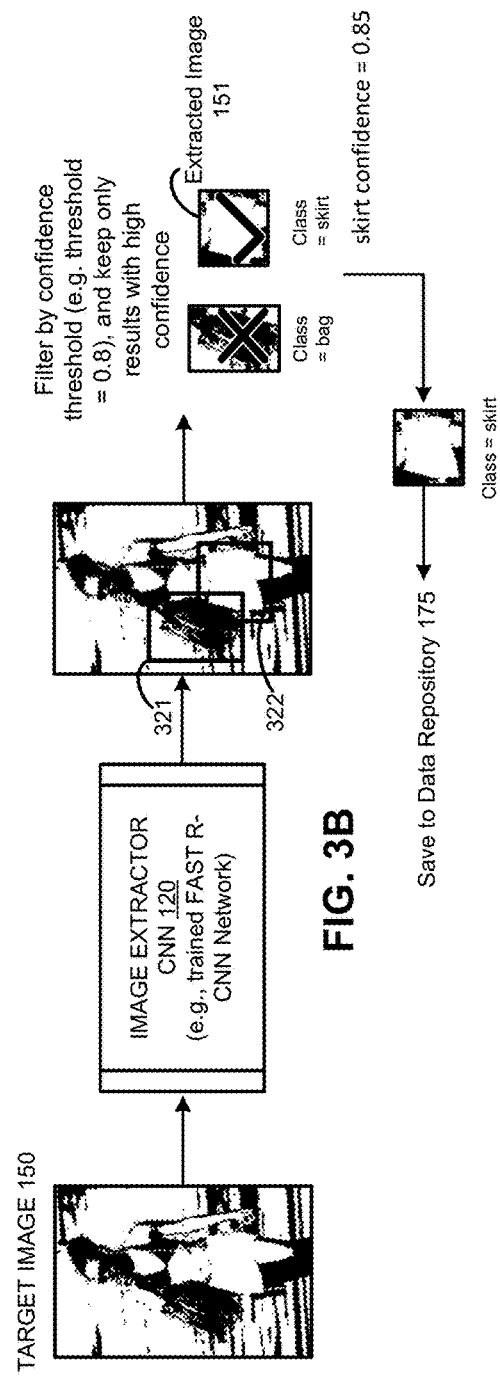

Once the image extractor CNN 120 is created, it may be used to classify objects in images. FIG. 3B shows an example of the target image 150 which is provided as input to the image extractor CNN 120. The image extractor CNN 120 identifies two classes of objects, i.e., a bag and a skirt, in the target image 150 and the locations of the objects, shown by bounding boxes 321 and 322. A confidence value is determined for each identified object. Objects with a confidence value greater than a threshold are extracted. For example, the skirt is extracted as shown, and the image of the skirt is saved in the data repository 175. The extracted image of the skirt may be used to identify similar images by the image matching server 131.

Figure 4A:
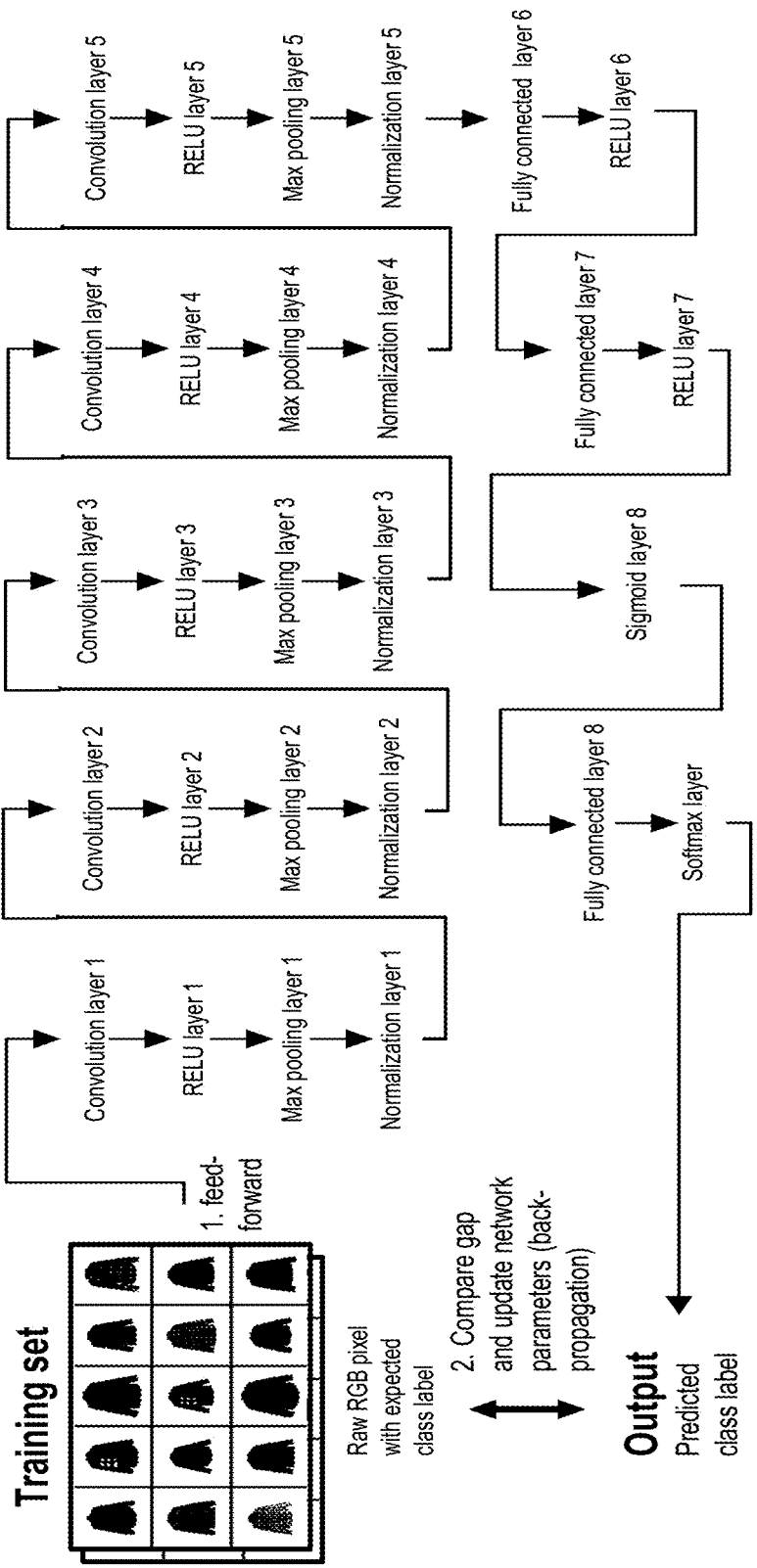
FIGS. 4A-B show an image attribute convolutional neural network, according to examples of the present disclosure.

FIG. 4A shows an example of training a CNN to create the image attribute CNN 121. Each image in the training set for training the CNN includes a class label. To train the CNN, network parameters for the CNN are initialized. Predetermined parameter models may be available that specify initial network parameters. Training data is input into the initialized CNN to calculate predictions of classes for the images of the training set. The difference between the expected classes which are specified for each image and the predicted classes are determined and used to update the network parameters with a back-propagation function. This process is iterated until a satisfactory prediction rate is achieved to create the image attribute CNN 121.

As shown in FIG. 4A, the image attribute CNN 121 for example includes a number of convolutional and subsampling layers followed by fully connected layers. The input to a convolutional layer is a m×m×r image where m is the height and width of the image and r is the number of channels, e.g. an RGB (red, green, blue) image has r=3. The convolutional layer will have k filters (or kernels) of size n×n where n is smaller than the dimension of the image. The size of the filters gives rise to the locally connected structure which are each convolved with the image to produce k feature maps of size m−n+1 (supposing the stride=1 and padding=0). Each map is then subsampled typically with mean or max pooling over p×p contiguous regions where p may range between 2 for small images and N (N>=5) for larger inputs. Either before or after the subsampling layer, an additive bias and rectified linear unit (RELU) layer is applied to each feature map.

Figure 4B:
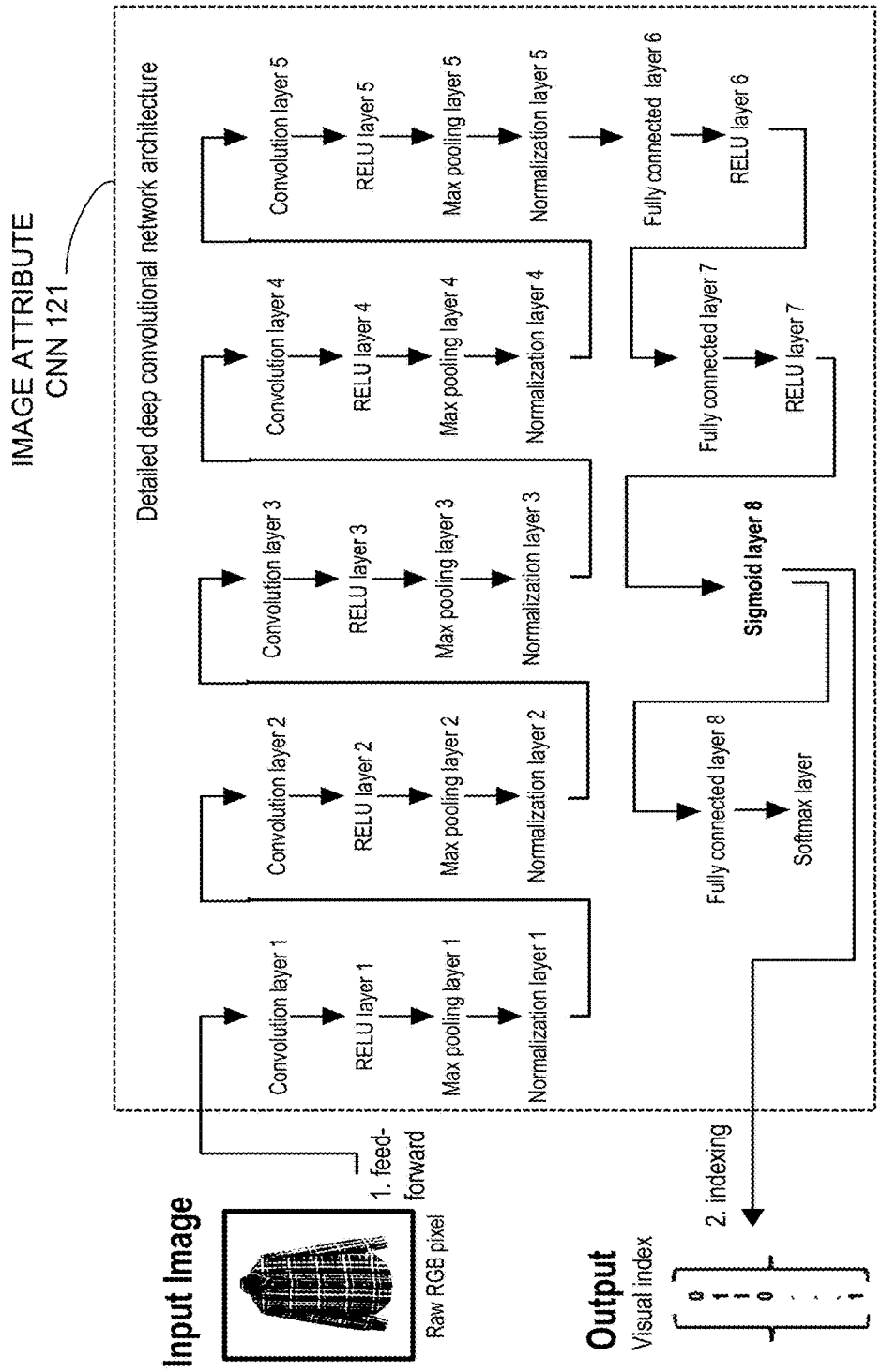

Once the CNN is trained to create the image attribute CNN 121, the image attribute CNN 121 may be used to index visual features of the extracted image 151 as shown in FIG. 4B. For example, the output of the "sigmoidal layer 8" is used as the visual index of the extracted image 151, and includes a binarized vector, such as [0 1 1 0 . . . 1], representing the visual features (also referred to as the attributes) of the extracted image 151. For example, the binarized vector represents an index of visual features $x_i$ determined from a previous layer (e.g., RELU layer 7) that are binarized to 0 or 1. For example, for each visual feature x, a value of 0 or 1 is determined based on whether $x_i$ is greater than or equal to a threshold (e.g., $x_i$=1) or less than the threshold (e.g., $x_i$=0). The threshold may be selected by maximizing the classification accuracy on training data. Images to be compared to an extracted image are also run through the image attribute CNN 121 to determine a binarized vector of attributes for each image, and the binarized vectors are stored in the data repository 175. The binarized vector of attributes for the extracted image 151 may be compared to the binarized vectors of attributes for other images to identify similar images. Hamming distance between two binarized vectors of equal length is the number of positions at which the corresponding symbols are different. For example, H([0 11],[1 1 1])=1; and H([0 0 1],[1 1 1])=2. Comparisons that have the smallest hamming distances yield the images that are most similar to the extracted image 151.

Figure 5:
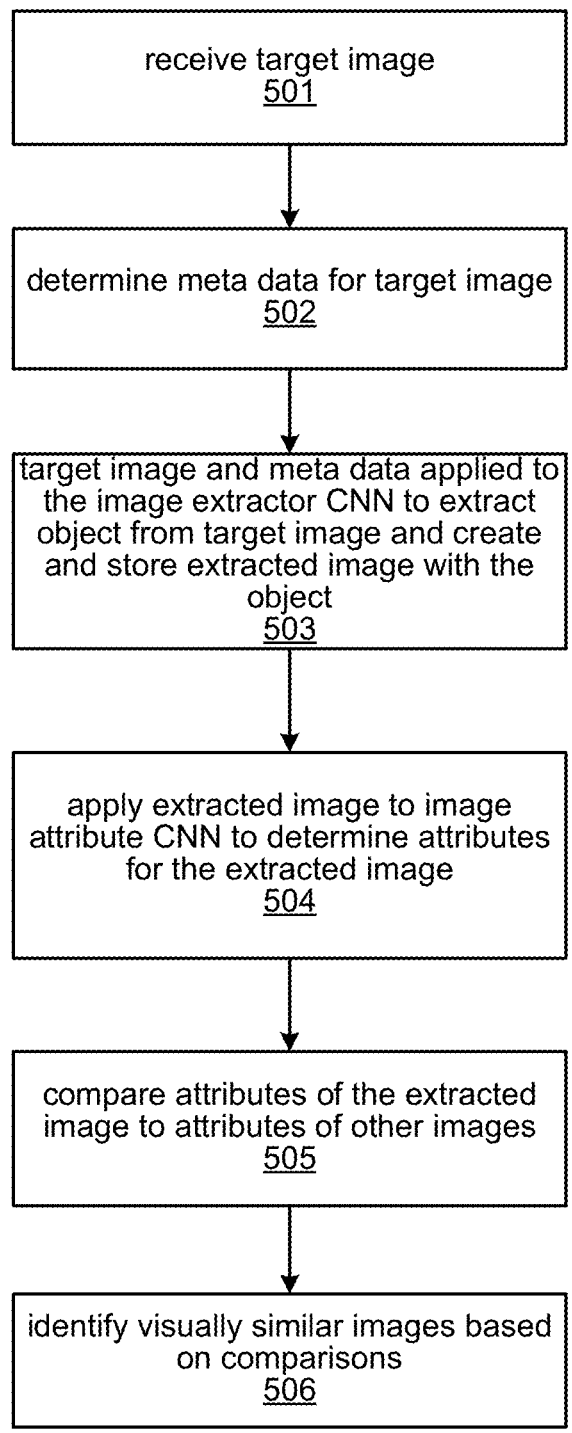
FIG. 5 shows a flow chart of a method to identify visually similar content, according to an example of the present disclosure.

FIG. 5 shows an example of a method 500. The method 500 and other methods described herein may be performed by one or more servers or other types of computers including at least one processor executing machine readable instructions embodying the methods. For example, the image processing server 130 and/or the image matching server 131 shown in FIG. 1 may store machine readable instructions 194 embodying the methods, and processor 191 may execute the machine readable instructions. The method 500 is described by way of example as being performed by the system 100.

At 501, the target image 150 is received for example by the image processing server 130. At 502, meta data for the target image is determined. The meta data for example identifies a class of an object in the target image 150. The meta data may be provided with the file containing the target image 150 or may be provided in a web site containing the target image 150 if the target image 150 is obtained from a web site. In an example, the meta data may be used to identify a particular CNN for determining the extracted image 151 from the target image. For example, if the CNN 120 comprises multiple CNNs trained to identify objects in different classes, the meta data may be used to identify a class of objects associated with the target image 150, and the class of objects may be used to identify a particular CNN associated with the class. The target image 150 is applied to the identified CNN to determine the extracted image 151. In some situations, meta data may not be available or the meta data may not identify a class or include information that can identify a particular CNN to use. In those situations, the target image 150 may be applied to multiple CNNs. The output with the highest confidence value may be selected to extract the extracted image 151 or if none of the outputs has a satisfactory confidence value, such as determined by comparing to a threshold, then no image may be extracted.

At 503, the target image 150 and the meta data is applied to the image extractor CNN 120 to extract an object from the target image 150 if the target image 150 includes an object in a particular class of objects that the image extractor CNN 120 was trained to identify. FIG. 3A-B describe an example of the image extractor CNN 120 identifying an object from the target image 150 and generating the extracted image 151 which includes the object. At 504, the extracted image 151 is applied to the image attribute CNN 121 to determine attributes for the extracted image 151. For example, a binarized vector of image features are determined by the image attribute CNN 121 for the extracted image 151. At 505, the attributes of the extracted image 151 are compared to attributes of other images. For example, the binarized vector of image features for the extracted image 151 is compared to binarized vector of image features for other images to find images that are similar to the extracted image 151. At 506, visually similar images are identified based on the comparisons performed at 505. Visual similarity may be based on similarity of features of images visible to the human eye. Similarity may be determined based on a mathematical comparison of attributes (e.g., visual features), such as based on calculated Hamming distances. For example. "similar" images may include images that are a closest match when comparing the attributes of the extracted image 151 and the attributes of the stored images. If Hamming distance is used for the comparisons, then images with the smallest Hamming distances may be considered similar images. A Hamming distance threshold may be set such that if an image has a Hamming distance greater than the threshold, then the image is not considered a similar image to the extracted image 151.

Figure 6A:
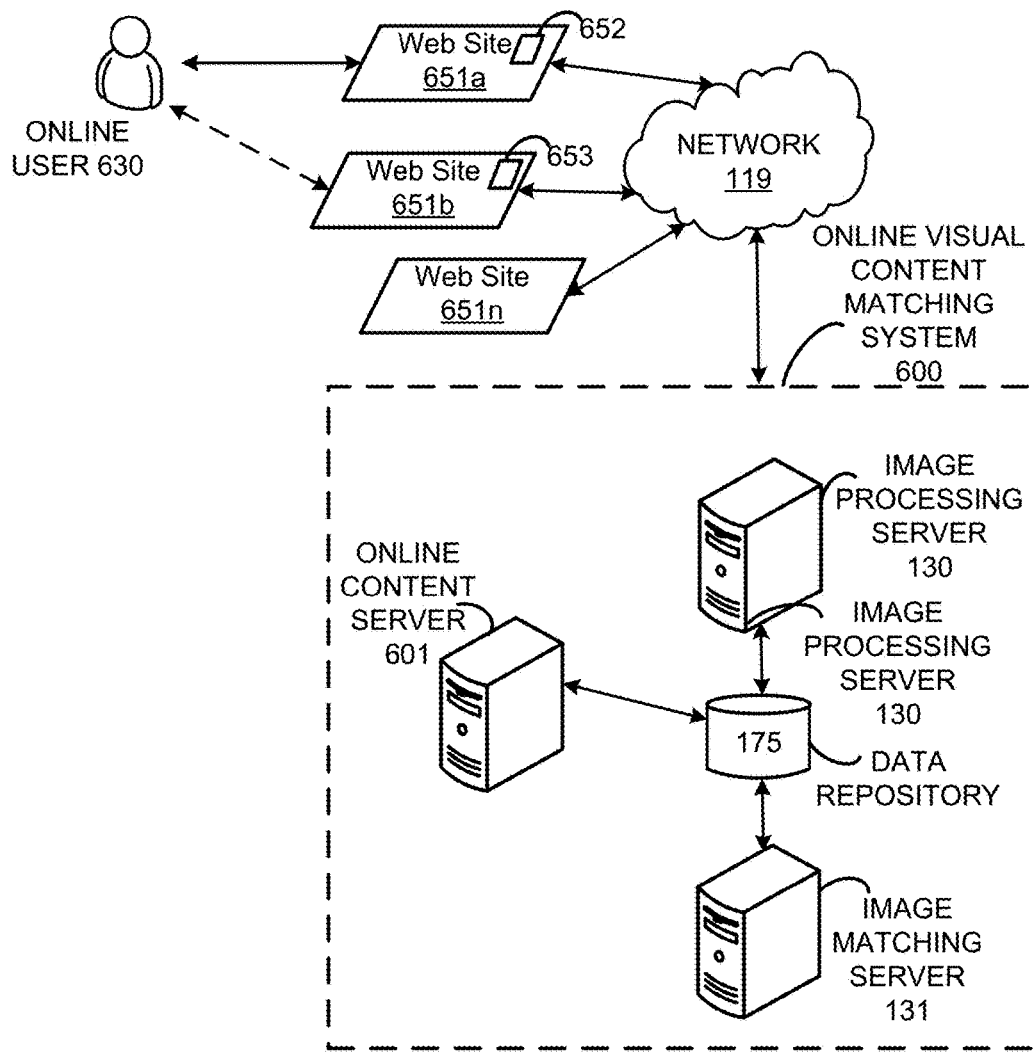
FIG. 6A shows an online visual content matching system, according to an example of the present disclosure.

The system 100 may be used for a variety of applications. One example of an application of the system 100 is to identify and deliver visually similar content to online visitors of a web site. FIG. 6A shows an example of an online visual content matching system 600 that may include the system 100. For example, the online visual content matching system 600 may include the image processing server 130, the image matching server 131 and the data repository 175 of the system 100, which is described with respect to FIG. 1. The online visual content matching system 600 may also include an online content server 601 which is further described below, and the network 119 includes the Internet. The online visual content matching system 600 can identify content viewed by an online user visiting a website, such as one of websites 651a, 651b or 651n, and identify stored content similar to the web site content viewed by the online user. The similar content may be delivered to the online user via the Internet.

Figure 6B:
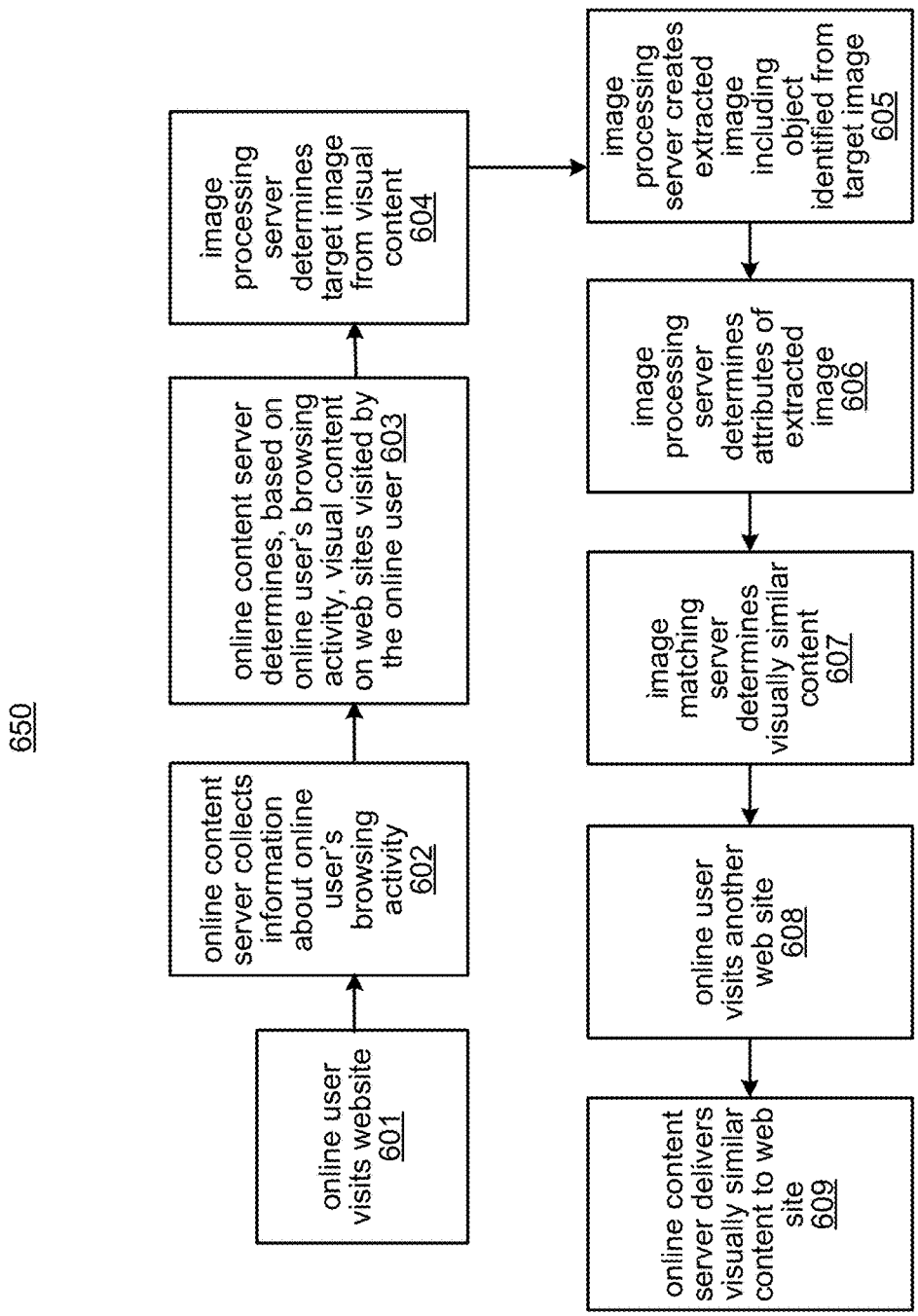
FIG. 6B shows a flow chart of a method to identify visually similar online content, according to an example of the present disclosure.

FIG. 6B shows an example of a method 650 performed by an online user and the online visual content matching system 600. The method 650 is described with respect to the online visual content matching system 600 by way of example. At 651, online user 630 visits a web site, such as web site 651a. At 602, the online content server 601 collects information about the online user's browsing activity. At 603, the online content server 601 determines, based on the online user's browsing activity, visual content on the web sites visited by the online user 630 and which may have been clicked on or otherwise viewed by the online user 630. The visual content may be the visual content 652 displayed on the web site 651a. A cookie may be used to determine the visual content according to the online user's browsing activity. For example, a cookie is stored in the online user's browser that can track the online user's browsing activity. The cookie may be a third party cookie that can be sent to the online content server 601 to determine the browsing activity, including browsing history, of the online user 630. The cookie may identify visual content 652 viewed or clicked on by the online user 630 at the web site 651a. Also, the cookie may identify the uniform resource locator (URL) of web sites visited by the online user 630. The online content server 601 may identify the visual content displayed on the web sites, such as by parsing the code, e.g., HyperText Markup Language (HTML) or other types of code, of the web sites. For example, the visual content 652 displayed on the web site 651a is identified from the cookie or by parsing the code of the web site 651a to identify images or image files. The visual content associated with the browsing activity of the online user 630 may be stored in the data repository 175.

At 604, the image processing server 130 determines the target image 150 from the visual content, e.g., visual content 652, determined at 603. For example, the visual content 652 may be an image provided in a GIF file or another type of file. The file is read to determine the target image 150. At 605, the image processing server 130 creates the extracted image 151 including an object identified from the target image 150. For example, the image extractor CNN 120 identifies an object from the visual content 652, and the object is cropped from the target image 150 to create the extracted image 151. At 606, the image attribute CNN 121 determines extracted image attributes 160 for the extracted image 151.

Figure 7A:
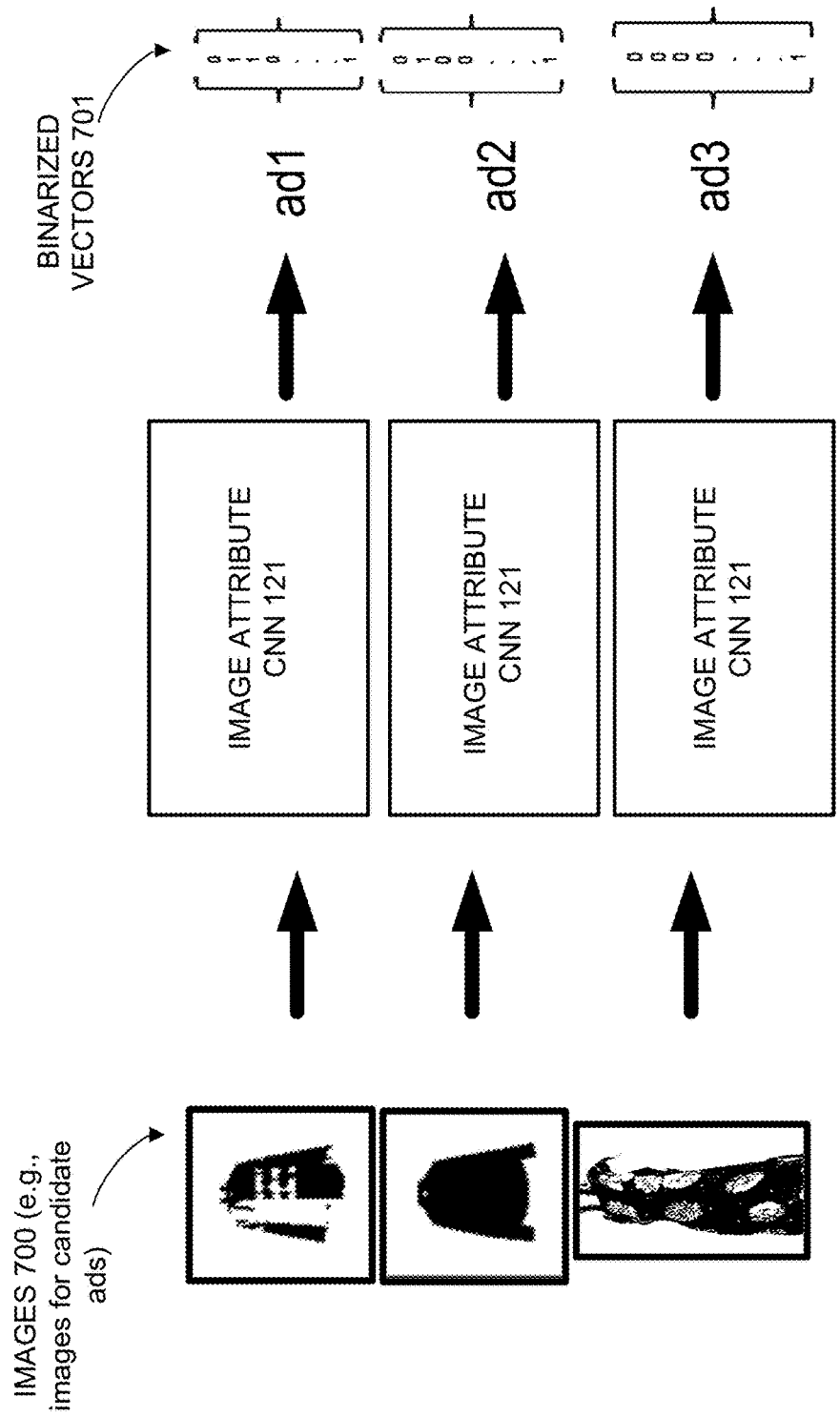
FIGS. 7A-B show determining visually similar content, according to examples of the present disclosure.

At 607, the image matching server 131 determines visual content similar to the visual content 652. For example, the extracted image attributes 160 are compared to image attributes of other images to find images similar to the visual content 652. For example, visual content 653 is identified as similar content to the visual content 652. The identified similar content is referred to as the visually similar content. The similar content, e.g., images, determined at 607 may be images that are similar but are not exact matches or are not the same image previously viewed or clicked on by the online user 630. If the same image or the same online advertisement including the same image is repeatedly delivered to the online user 630, the online user 630 may ignore it. The image matching server 131 may identify similar images stored in the data repository 175 and filter out images that are considered to be the same as the extracted image, e.g., the same as the visual content 652. For example, as shown in FIG. 7A.

At 608, the online user 630 visits another web site, such as the web site 651b. At 609, the online content server 601 delivers the visually similar content, e.g., visual content 653, to the web site 651b. The tracking cookie may be used to determine the current web site visited by the online user 630. The visual content 653 may be displayed in the web site 651b to the online user 630. The visually similar content may also be displayed on the web site 651a if the online user 630 remains at the web site 651a instead of moving to the web site 651b, or may be displayed at any web site the online user 630 visits if the web site has the ability to display visual content delivered by the online content server 601.

Figure 7B:
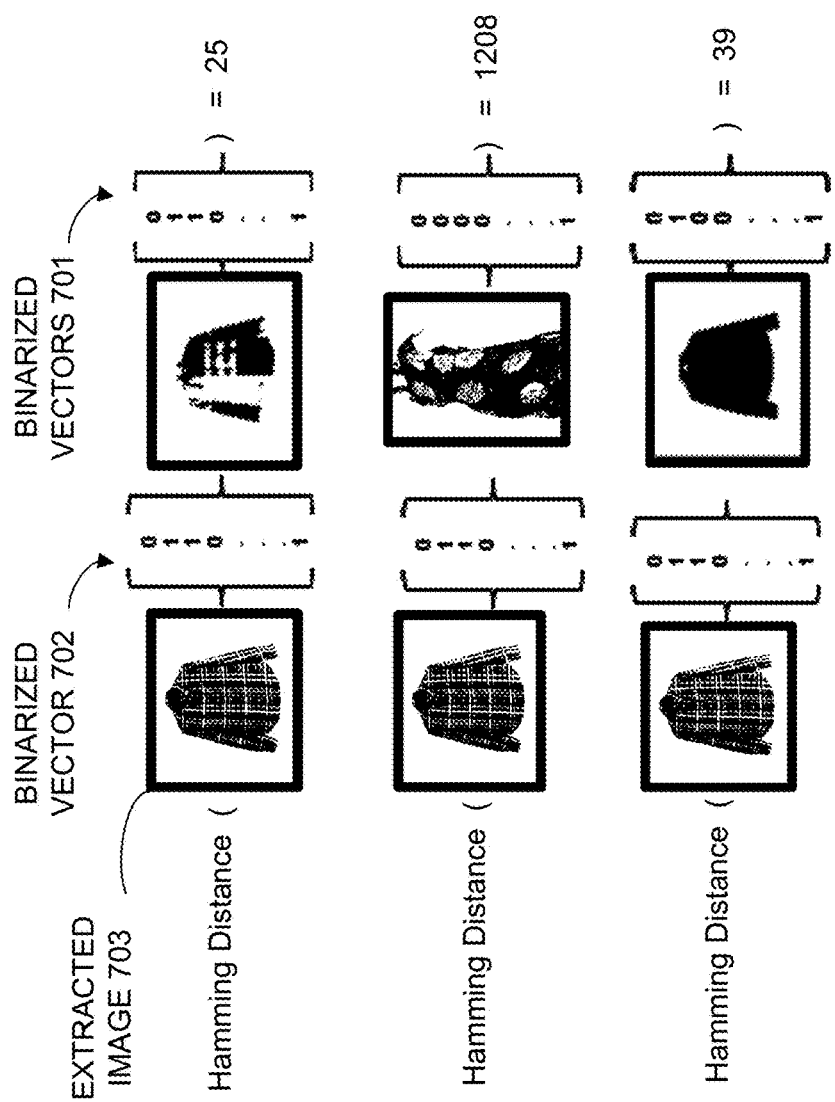

According to an example, the visual content 652 may be an image of a product viewed by the online user 630 at the web site 651a. The online visual content matching system 600 may be used to identify visually similar content to the image of the product viewed by the online user 630 at the web site 651a. For example, as shown in FIG. 7A, images 700 may include images for candidate online advertisements or for candidate product recommendations that may displayed to online user 630. An online advertisement may include a web page including at least one image. The images 700 are provided as input to the image attribute CNN 121 to determine the binarized vectors 701, such as [0 1 1 0 . . . 1], etc., representing the visual features (also referred to as the attributes) of the images 700. The images 700 and/or the binarized vectors 701 may be stored in the data repository 175. FIG. 7B shows an extracted image 703, which may be an image of a product viewed by the online user 630 at the web site 651a. The extracted image 703 is provided as input to the image attribute CNN 121 to determine the binarized vector 702, representing the visual features (also referred to as the attributes) of the extracted image 703. The binarized vectors 701 of the images 700 are compared to binarized vector 702 of the extracted image 703 to identify a closest matching image that is not the same image. For example, the comparison may include determining Hamming distances, and the Hamming distances are shown. The closest matching image is the image with a Hamming distance of 25. An online advertisement or a product recommendation including the closest matching image (e.g., visually similar content) may be presented to the online user 630. The visually similar content may be products that look similar to the product viewed at the web site 651a but are different. For example, while the online user 630 is at the web site 651a, the visually similar content may be delivered to the web site 651a and presented to the online user 630, so the online user 630 may be able to view products similar to the product displayed in the visual content 652. Also, the visually similar content may be delivered to a different web site, such as the web site 651b, when the online user 630 visits the web site 651b.

In another example, the visually similar content may be provided in online advertisements. For example, the online user 630 views visual content 652 at web site 651a. By way of example, the visual content 652 may be a product viewed on the web site 651a or may include visual content associated with an online advertisement displayed and clicked on at the web site 651a. The online content server 601 may include an online advertisement targeting platform that identifies online advertisements to deliver to an online user based on their preferences, needs, habits, etc. The online content server 601 identifies online advertisements for products that are visually similar to the visual content 652. For example, the data repository 175 stores images of products and/or their attributes, such as determined by the image attribute CNN 121. The image matching server 131 compares the attributes of the visual content 652, which may also be determined by the image attribute CNN 121, to the stored attributes of images of products to find visually similar products. The online content server 601 selects online advertisements for the visually similar products. The online content server 601 may deliver the online advertisements for the visually similar products to the web site 651a while the online user is at the web site 651a or while the online user is at a different web site, such as the web site 651b. Accordingly, the online user 630 may view online advertisements that are relevant to the browsing activities of the online user 630 and which may be relevant to the online user's preferences, needs, habits, etc. This is further illustrated by the example discussed below.

For example, the online user 630 user views fashion images with colorful dresses at the web site 651a. The online visual content matching system 600 identifies visually similar images to the dresses viewed by the online user 630 and may present online advertisements or product recommendations for products from the visually similar images. The visually similar images may be for products having different brands, and the brands may be different than the brand of dresses viewed at the web site 651a. Thus, the online user 630 can be presented with a variety of products and brands related to the visual browsing history of the online user 630 and match the visual preferences of the online user 630. This is markedly different from conventional online advertisement retargeting platforms. Currently, when an online user visits different web sites, the online user may be repeatedly presented with online advertisements for the same product. Often, these online advertisements are ignored. The online visual content matching system 600 facilitates the delivery of online advertisements for different products which are visually related to the online user's browsing activity. Accordingly, the online visual content matching system 600 provides a technical solution to the technical problem of how to identify diverse visual content related to the online user's browsing activity. The technical solution may include the machine learning classifiers, such as the CNNs 120 and 121, that facilitate the real-time selection and delivery of visually similar content to the online user.

According to an embodiment, a data repository stores image data for images; an image processing server receives a target image; determines meta data for the target image, wherein the meta data describes an object in the target image; applies the target image and the meta data to an image extraction convolutional neural network to identify an object in the target image and extract an image of the object; and applies the extracted image to an image attribute convolutional neural network to determine attributes represented by vectors of numeric values for the extracted image. An image matching compares the attributes for the extracted image with attributes of the images having image data stored in the data repository; and identifies images similar to the extracted image based on the comparison of the attributes for the extracted image with the attributes of the images having image data stored in the data repository. The image extraction convolutional neural network determines a location and a bounding box to extract the image of the object from the target image, and crop the target image around the bounding box to generate the extracted image of the object. The meta data of the target image comprises a class for each of the objects, and the image extraction convolutional neural network determines a location and a size of a bounding box for each object in the target image to extract an image of each object from the target image. The image extraction convolutional neural network determines a confidence value by a softmax layer in the neural network for each class indicating an accuracy of predictions by the image extraction convolutional neural network that the target images contains the objects at the locations. The image processing server is to reject objects associated with predictions having a confidence value that is less than a threshold.

According to another embodiment of the present disclosure, a machine learning image processing system 800 performs natural language processing (NLP) and auto-tagging for an image matching process. The NLP and auto-tagging may be used to enhance the image similarity determinations performed by the system 100, as is further discussed below. The system 800 facilitates an interactive process, e.g., through a mobile application, to obtain an image and supplemental user input from a user to execute an image search. The supplemental user input may be provided from a user as speech or text, and NLP is performed on the supplemental user input to determine user intent and additional search attributes for the image search. Using the user intent and the additional search attributes, the system 800 may perform enhanced image matching on stored images that are tagged with attributes through an auto-tagging process. In an embodiment, the stored images may include images of products, and the enhanced image matching may be performed to identify matching product images that may be used as product recommendations for online shopping or other e-commerce. Accordingly, the system 800 may facilitate an improved and interactive method for providing product recommendations based on enhanced image searching. It will be apparent to one of ordinary skill in the art that the interactive and enhanced image matching performed by the system 800 may be used for applications and uses other than image-based product recommendation, including substantially any application that may utilize image matching.

Figure 8:
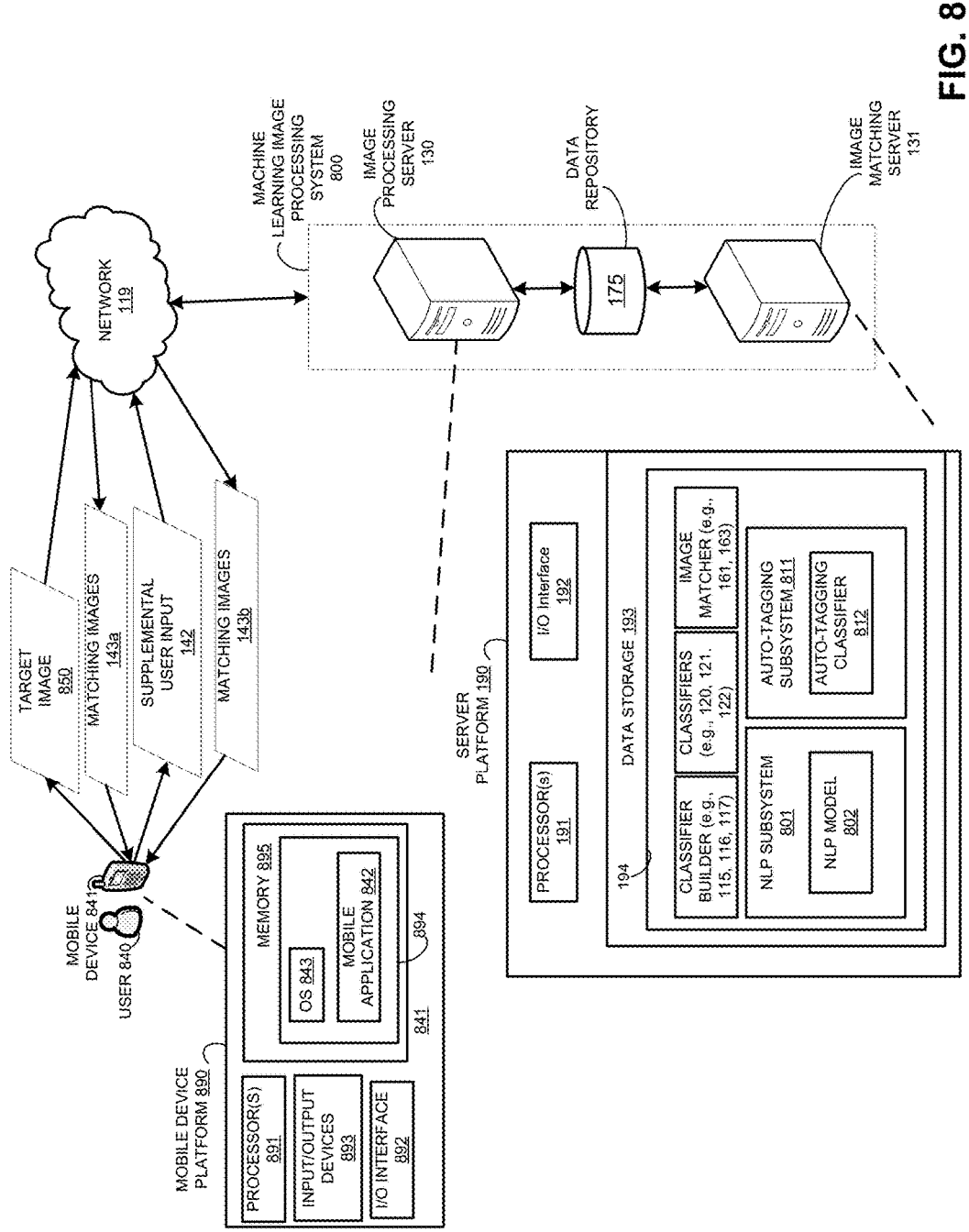
FIG. 8 shows a machine learning image processing system, according to another example of the present disclosure.

With reference to FIG. 8, there is shown a system diagram of the system 800. The system 800 may include the components of the system 100 but may further include an NLP subsystem 801 and an auto-tagging subsystem 811 to provide interactive and enhanced image searching and matching. As discussed above with respect to the system 100 shown in FIG. 1 and other figures discussed above, the image extractor CNN builder 115 may build the image extractor CNN 120, and the image attribute CNN builder 116 may build the image attribute CNN 121. The image extractor CNN 120 may be used to identify objects in digital images, and the image attribute CNN 121 may be used to determine attributes of images classified by the image attribute CNN 121, which may be used by the image comparator 161 and the similarity detector 163 to determine similar images 165 to a target image, such as target image 150.

The system 800 may include the components of the system 100 to determine similar images 165 to a target image. For example, as shown in FIG. 8, the system 800 may include image processing server 130 and image matching server 131 similar to the system 100. Also, the system 800 may include the classifier builder (e.g., 115 and 116) and the classifiers (e.g., 120 and 121) and the image matcher (e.g., 161 and 163) which may be used to determine similar images to a target image. An image matching subsystem of the system 800 may include the image matcher, the classifiers and other components for determining matching images. The image matching subsystem may determine predictions for tags by applying the classifiers to images, and can further utilize supplemental user input to determine a matching subset of images as is further discussed below, and transmit the matching subset of images to the mobile device 841.

The system 800 includes the NLP subsystem 801 that may create and store an NLP model 802 for determining a supplemental image search attribute based on supplemental user input. Also, the auto-tagging subsystem 811 may include an auto-tagging classifier 812 to determine attributes of images stored in the data repository 175, and the images may be tagged with their attributes determined by the auto-tagging classifier 812. Tagging the images with their attributes may include storing the attributes determined for each image, such as in the form of meta data for each image, in the data repository 175. The attributes tagged to each image may be used to further search the image repository 175 for matching images based on the supplemental user input 142.

The system 800 may communicate with a mobile application 842 hosted on a mobile device 841 to perform various operations discussed below. An example of a platform 890, including hardware and software components for the mobile device 841, is shown. The mobile device 841 includes a processor (e.g., one or more processors) and data storage, including memory 895. The processor 891 for example is an integrated circuit. The processor 891 may be a chipset with central processing unit and/or custom processing circuits, such as an application-specific integrated circuit (ASIC), field-programmable gate array (FPGA) and/or a graphic processing unit. The processor 891 may run an operating system (OS) 843 and applications, including the mobile application 842. The OS 843 and the applications may include machine readable instructions 894 stored in the memory 895 or other non-transitory data storage and executed by the processor 891. The mobile device 841 includes input/output (I/O) devices 893 such as keyboard, display (e.g., touch screen display), speaker, microphone, digital camera, etc. The mobile device 841 may include I/O interface 892 (e.g., one or more I/O interfaces) which may be wired and/or wireless, for communicating with other devices. For example, the I/O interface 892 may include a Wi-Fi interface, a cellular interface, a Bluetooth interface, etc. The mobile device 841 may include a smart phone, tablet, laptop, or another type of mobile device. Also, instead of a mobile device, another type of device, such as a desktop computer, workstation, etc., may be used. Also, instead of mobile application 842, a web application may be used to provide one or more operations of the mobile application 842.

Examples of operations performed by the mobile device 841 and the system 800 are now described. A user 840 may launch the mobile application 842 on the mobile device 841 and be prompted to capture an image of an object. For example, the mobile application 841 may be an application that provides product recommendations based on image matching and may facilitate purchase of a product. The user 840 captures an image of an object that the user may be desired by the user 840. The user 840 may take a picture of the object with a camera of the mobile device 841 to capture a digital image of the object, e.g., target image 850. The mobile application 842 may transmit the target image 850 to the system 800 via the network 119. The system 800 determines matching images 143*a* from the data repository 175 that match the target image 850. For example, such as described with respect to FIG. 1, the image extractor CNN 120 may be used to identify an object in a digital image, such as an object in the target image 850, and the image attribute CNN 121 may be used to determine attributes of the image of the object in the target image 850. The image comparator 161 and the similarity detector 163 may determine images from the data repository 175 that match the target image 850, such as images (e.g., matching images 143*a*) that match an object extracted from the target image 850.

The user 840 may provide supplemental user input 142 including additional criteria for searching for images similar to the matching images 143*a*. In an embodiment, the system 800 may transmit the matching images 143*a* to the mobile device 841, and the mobile application 842 displays the matching images 143*a* on the mobile device 841. The user 840 may view the matching images 143*a*, and provide supplemental user input 142 to further define the criteria for identifying matching images and products. In another embodiment, the user may provide the supplemental user input 142 without the system 800 providing the matching images 143*a* to the mobile application 842. In an example, the user 840 may provide the supplemental user input 142 in the form of speech or text. Also, speech input may be converted to text by a speech-to-text module of the mobile application 842. The mobile application 842 transmits the supplemental user input 142 to the system 800 via the network 119, and the system 800 receives the supplemental user input 142, and provides the supplemental user input 142 to the NLP model 802. The NLP model 802 determines one or more supplemental image search attributes from the supplemental user input 142. The image matching server 131 may use the one or more supplemental image search attributes and the attributes tagged to the images stored in the data repository 175 to determine a new set of matching images, e.g., matching images 143*b*. The system 800 may transmit the matching images 143*b* to the mobile device 841, and the mobile application 842 may display the matching images 143*b*. The process may be repeated any number of times. For example, the user 840 may provide additional supplemental user input after viewing the matching images 143*b*, and the system 800 may determine a new set of matching images from the matching images 143*b* and the additional supplemental user input for transmission to the mobile device 841. In an example, the mobile application 842 displays the matching images 143*b*, and the user 840 may select an image of the matching images 143*b* to determine more information about a product displayed in the matching image and/or to purchase the product.

Figure 9:
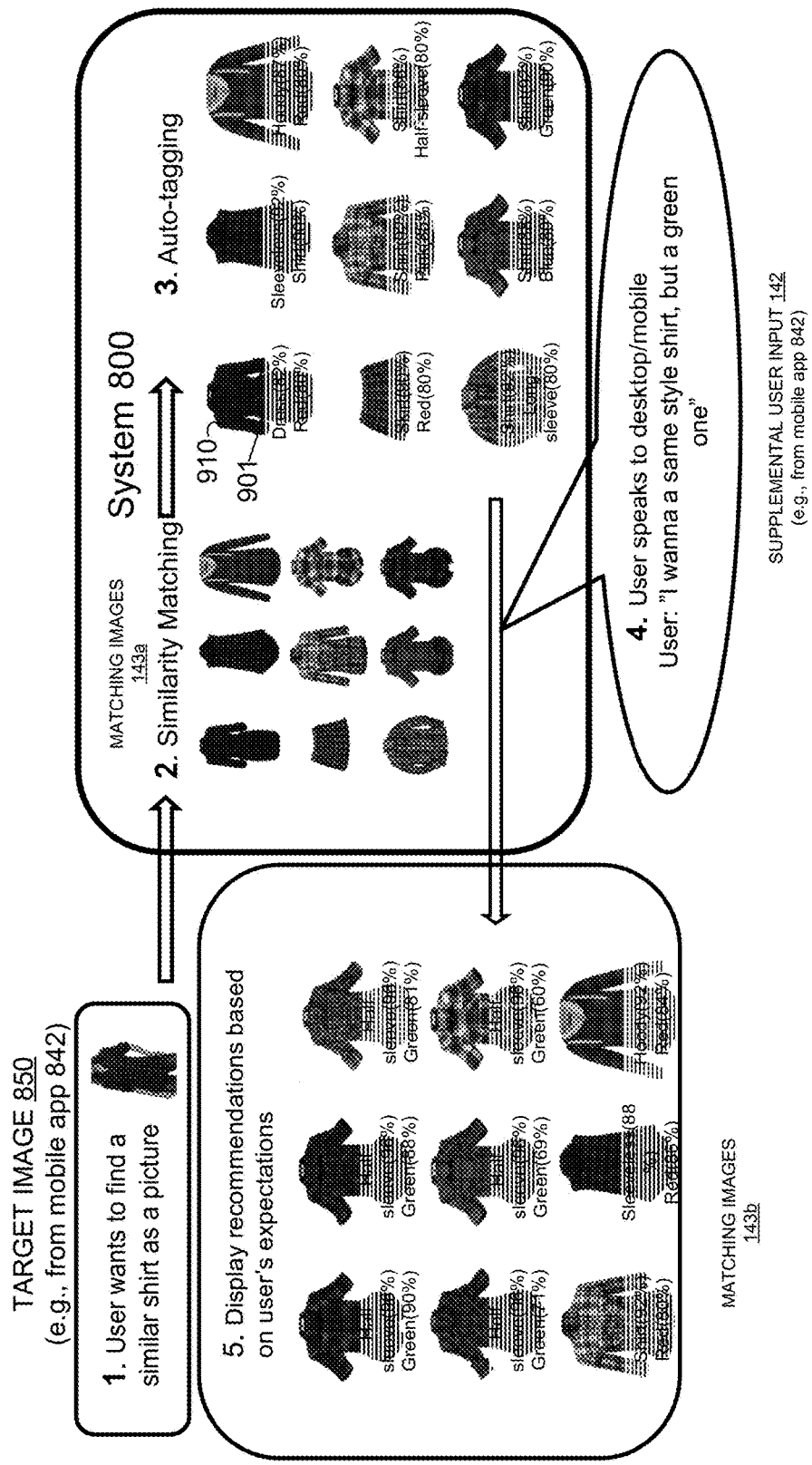
FIG. 9 shows a data flow diagram, according to an example of the present disclosure.

FIG. 9 is a flow diagram showing operations performed by the mobile application 842 and the system 800. For example, the user 841 takes a picture with the mobile device 841 to capture an image of an object for a search. The captured image is shown as the target image 850, and the object in the image, for example, is a plaid, women's shirt. The mobile application 842 may be executed on the mobile device 841 to allow the user to capture the target image 850 via a digital camera of the mobile device 841, and the mobile application 842 sends the target image 850 to the system 800. The system 800 performs similarity matching, such as discussed above, to determine the matching images 143a from the data repository 175. The tagged attributes of the matching images 143a are determined, for example, from the meta data for the matching images 143a. The meta data may include the tagged attributes determined through the auto-tagging process. Examples of the tagged attributes of the matching images 143a are shown in FIG. 9. For example, the tagged attributes, labeled 901 for a first matching image 910, include Dress (82%) and Red (80%). The numeric values in parentheses represent a confidence value of a prediction made by the auto-tagging classifier 812 that the image includes an object belonging to particular class. For example, the auto-tagging classifier 812 predicts that the first matching image 910 has an 82% probability of belonging to the dress class and an 80% probability of belonging to the red class. The predicted classes may be for categories of tags, also referred to as tag types. For example, the categories of tags may include brand, color, price, size, style, garment type, etc., and under each category of tag, there may be several classes. For example, under color, there may be classes for red, green, blue, etc., and under garment type, there may be classes for dress, skirt, shirt, etc. Other examples of tagged attributes are shown in FIG. 9 for other ones of the matching images 143a.

An example of the supplemental user input 142 is also shown in FIG. 9. For example, the user 840 speaks into a microphone of the mobile device 841 to provide the supplemental user input 142 to the mobile application 842. The speech may include "I wanna a same style shirt, but a green one". The speech may be converted to text, and the text is provided to the NLP subsystem 801. The NLP subsystem 801 applies the text to the NLP model 802 to determine object attribute search criteria from the text. For example, the NLP subsystem 801 determines that the intent of the user's speech was to search for the same style shirt as shown in the target image 850, but in a green plaid instead of a red plaid. Then, the image searching is enhanced to identify green plaid shirts from the matching images 143a and/or other images stored in the data repository 175 to identify the matching images 143b. The matching images 143b may be sorted based on relevance, so images that are less likely to be matches may be placed in the bottom row. The matching images 143b may be displayed to the user 840 via the mobile application 842, and the user 840 may select one of the matching images to execute a purchase of a product shown in selected one of the matching images 143b, such as if the mobile application 842 is an ecommerce mobile application.

Figure 10:
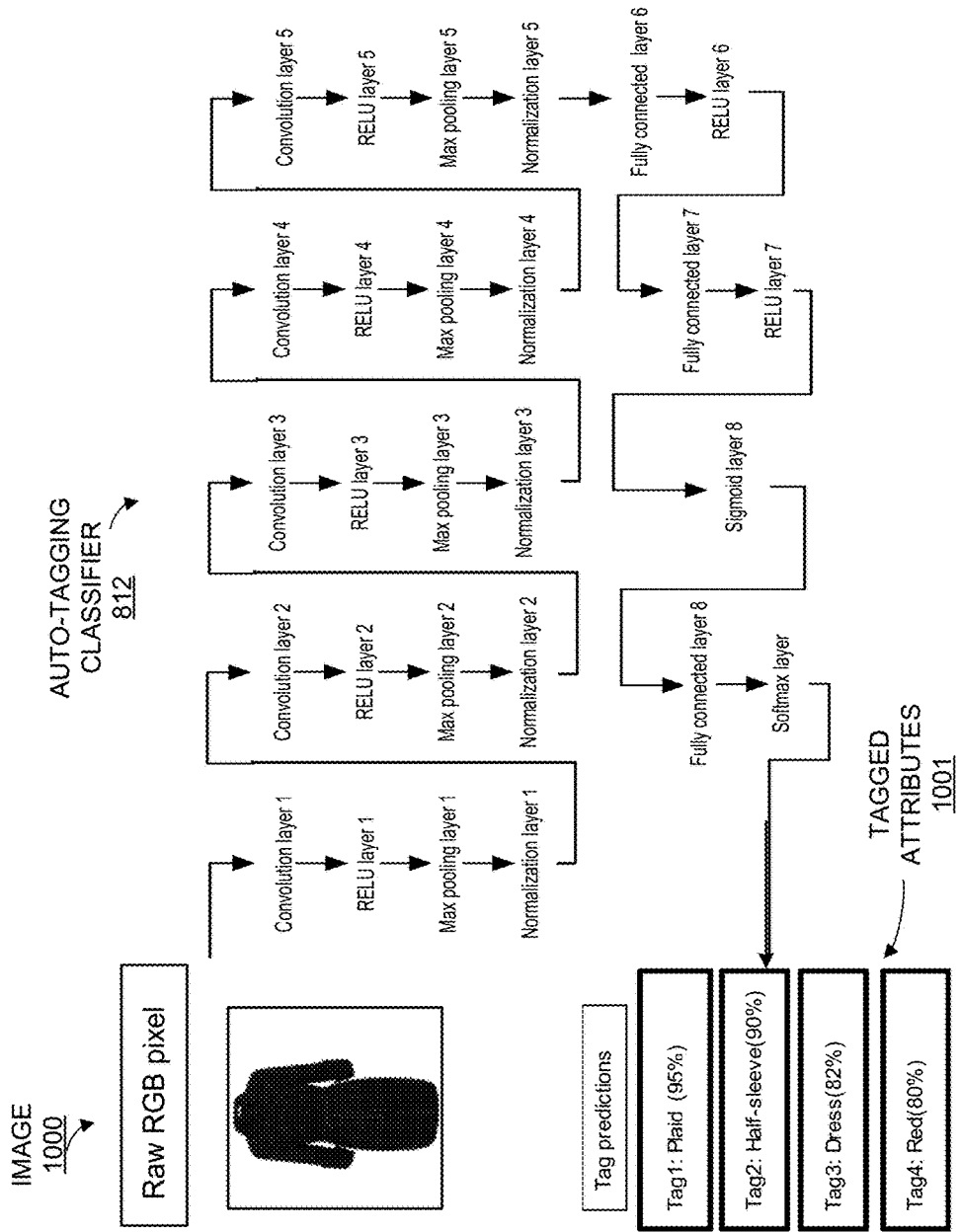
FIG. 10 shows an auto-tagging classifier, according to an example of the present disclosure.

FIG. 10 shows the auto-tagging process, according to an embodiment. For example, the auto-tagging classifier 812 makes class predictions on images input to the auto-tagging classifier 812. For example, the image 1000 is provided as input to the auto-tagging classifier 812, and the output of the auto-tagging classifier 812 are predictions 1001. The predictions 1001 include tags 1-4. Each tag may be a class, and includes a probability of whether the image 1000 belongs to the class. For example, tags 1-4 indicate respectively that the auto-tagging classifier 812 predicts the image 1000 has a 95% probability of containing a plaid object; a 90% probability of containing a half sleeve object; an 82% probability of containing a dress, and an 80% probability of containing a red object. All or some of the images in the data repository 175 may be provided as input to the auto-tagging classifier 812 to determine tag predictions for each image and the tag predictions, e.g., the attributes, are stored with the images, and may be referred to as tagged attributes.

The auto-tagging classifier 812 may be a CNN such as shown in FIG. 4B, and the auto-tagging classifier 812 may be trained such as described above with respect to FIGS. 2 and 3A. For examples, labeled training sets may be used to train the auto-tagging classifier 812 to classify images into various classes. The types of tags, some of which are shown in FIGS. 9 and 10, may be predefined depending on the objects being classified. In FIGS. 9 and 10, the objects in images that are being classified, for example, are garments, and the predefined types of tags may be related to garments or fashion, such as brand, color, price, size, style, etc. The auto-tagging classifier 812 may make tag predictions for each type of tag. In an example, each type of tag may include multiple classes, such as different colors for the color tag type or different sizes for the size tag type, and so on. The auto-tagging classifier 812 may make predictions for each class. An auto-tagging classifier may be created for each tag type and determine predictions for the classes under the tag type. For example, the auto-tagging classifier 812 may include an auto-tagging classifier for brand (e.g., logo), an auto-tagging classifier for color, an auto-tagging classifier for price, an auto-tagging classifier for size, and an auto-tagging classifier for style. The auto-tagging classifier for color may make predictions for multiple colors. For example, the image 1000 is provided as input to the auto-tagging classifier for color, and the output may include a probability for a class prediction for each of multiple colors. Similarly, each of the other auto-tagging classifiers may make predictions for each class under the tag type being predicted by the respective auto-tagging classifier. The image may be tagged with the class having the highest probability under each tag type. In an example, the auto-tagging classifier 812 may include a classifier used for the similarity matching to determine the matching images 143a.

Figure 11:
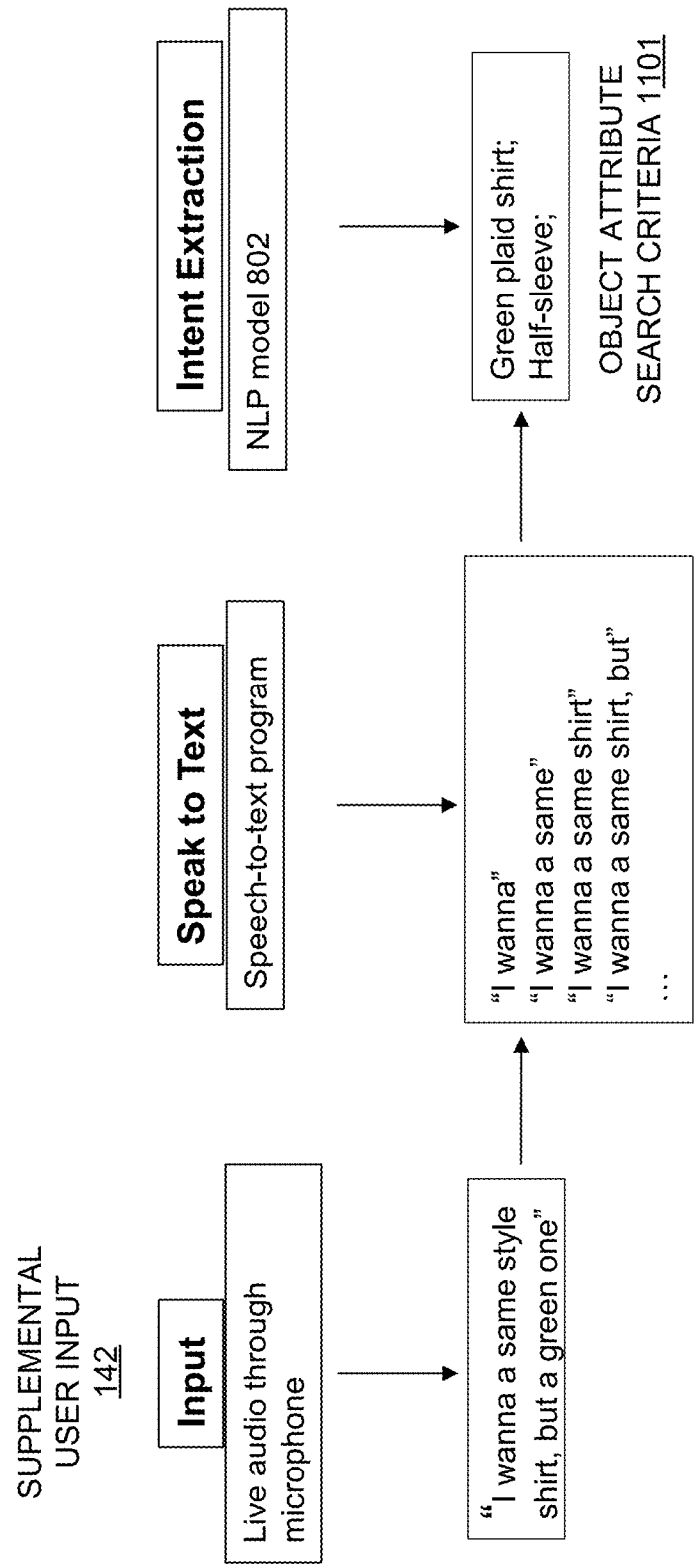
FIG. 11 shows a data flow diagram for natural language processing, according to an example of the present disclosure.

FIG. 11 shows an example of using the NLP model 802. For example, the supplemental user input 142 may include speech, such as "I wanna a same style shirt, but a green one". The speech may be converted to text by a speech-to-text program or module, and the text is provided to the NLP subsystem 801. The NLP subsystem 801 applies the text to the NLP model 802 to determine the object attribute search criteria 1101 from the text. For example, the NLP subsystem 801 determines that the intent of the user's speech was to search for the same style shirt as shown in the target image 850, but in a green plaid instead of a red plaid. The NLP model 802 may be trained according to a predetermined dictionary of terms related to fashion or garments. The terms may include the tag types and classes discussed above. Also, terms such as "same" or "different" or "but" or "and" may be used to determine whether attributes of the target image 850 should be modified or whether additional attributes should be used to search for the matching images 143b. In an example, the Natural Language Toolkit (NLTK), which an off-the-shelf suite of libraries and programs for symbolic and statistical natural language processing for English written in the Python® programming language, may be used to build the NLP model 802.

Figure 12:
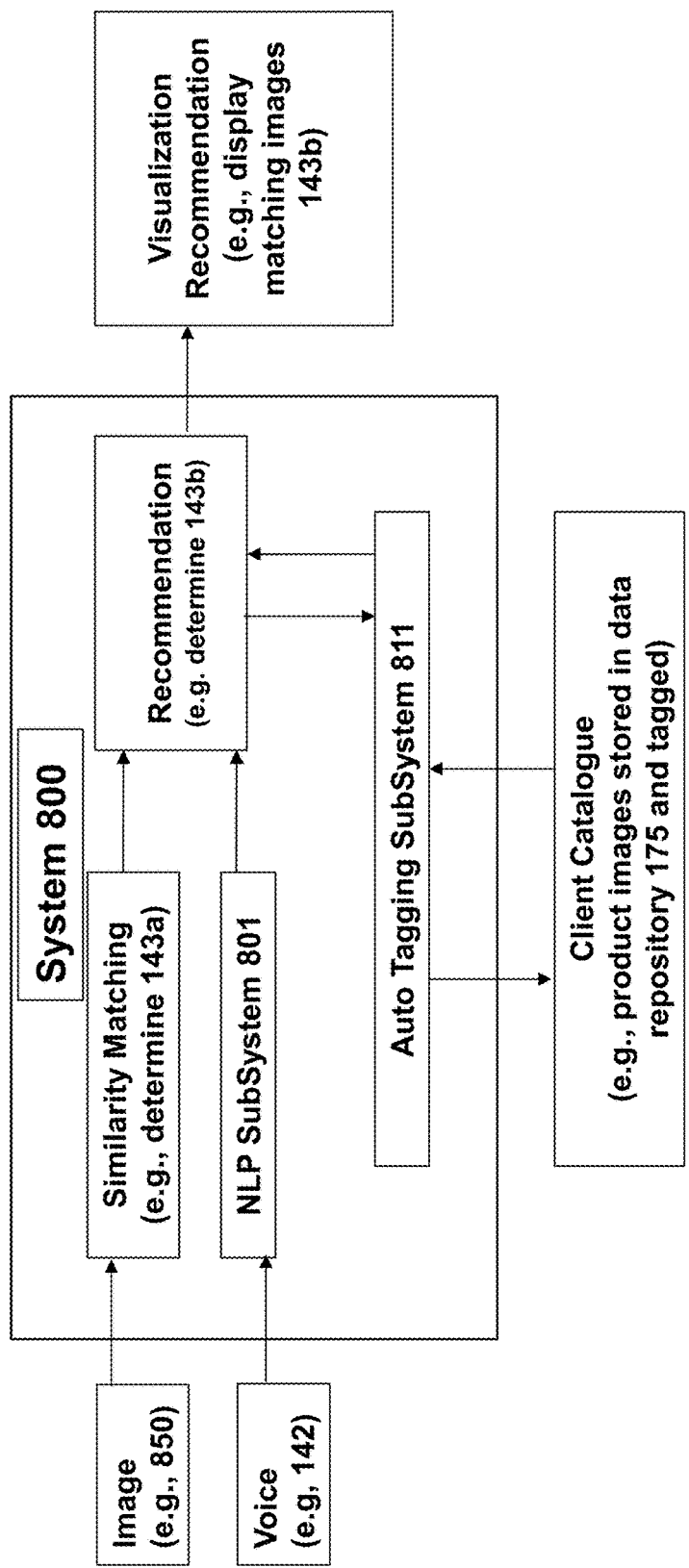
FIG. 12 shows a data flow diagram fir generating visual recommendations, according to an example of the present disclosure.

FIG. 12 shows an example of the system 800 generating visual recommendations, which may include visual product recommendations comprised of the matching images 143b. The client catalogue may include product images, and may be stored in the data repository 175. The product images may be tagged by the auto-tagging subsystem 811. The input to the system 800 may be an image captured by the mobile application 842, such as the target image 850. The input to the system 800 may also include the supplemental user input 142 comprised of speech. Similarity matching performed by the system 800 may determine the matching images 143a. The NLP subsystem 801 may determine the object attribute search criteria 1101 from the supplemental user input 142, and the system 800 determines a recommendation, such as the matching images 143b from the matching images 143a, the object attribute search criteria 1101, and the tagged images in the data repository 175. The matching images 143b may be displayed by the mobile application 842 on the mobile device 841.

Figure 13:
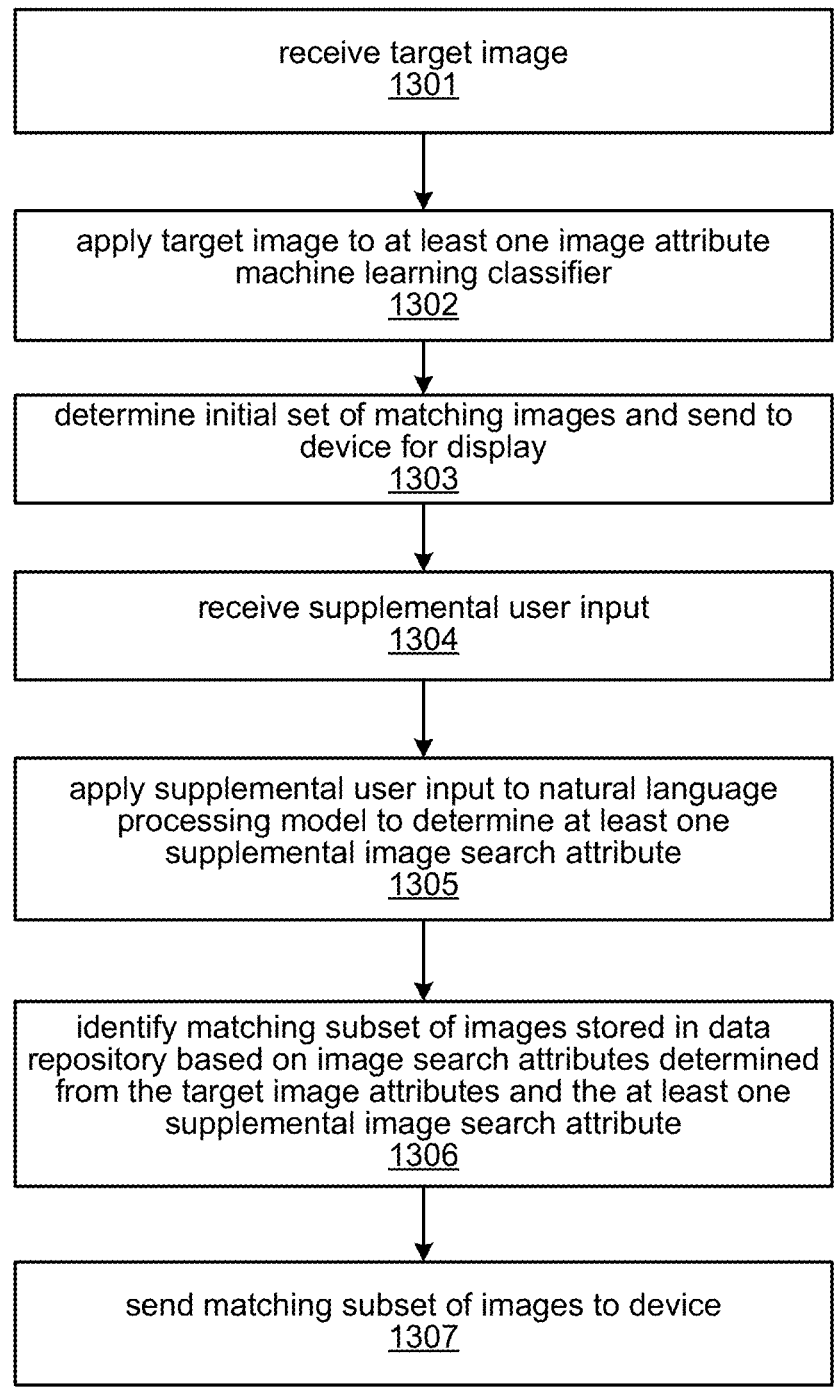
FIG. 13 shows a flow chart of a method for image matching, according to an example of the present disclosure.

FIG. 13 shows an example of a method 1300. The method 1300 may be performed by the system 800 or another system to perform image matching. The method 1300 is described by way of example as being performed by the system 800, and may be performed by other systems. The method 1300 and other methods described herein may be performed by one or more servers or other types of computers including at least one processor executing machine readable instructions embodying the methods. For example, the image processing server 130 and/or the image matching server 131 shown in FIG. 8 may store machine readable instructions 194 embodying the methods, and processor 191 may execute the machine readable instructions. Also, one or more steps of the method 1300 may be performed according to the steps of the method 500 shown in FIG. 5. For example, the method 500 includes steps 501-506 for identifying visually similar images. These steps may be performed for steps 1301-1303 to determine the initial set of matching images, such as the matching images 143a. Also, one or more of the steps of the method 1300 and steps of other methods described herein may be performed in a different order than shown or substantially simultaneously.

At step 1301, the system 800 receives the target image 850. In an example, the target image 850 may be captured and sent to the system 800 by the mobile device 841 executing the mobile application 842, and the system 800 receives the target image 850, via a network interface (e.g., I/O interface 192), connecting a computer of the system 800 to the network 119.

At 1302, the system 800 applies the target image 850 to at least one image attribute machine learning classifier. For example, the target image 850 is applied to the auto-tagging classifier 812 to determine attributes of the target image 850. The auto-tagging classifier 812 may determine predictions for multiple tag types (e.g., brand, color, price, size, style, garment type, etc.) and multiple classes for each tag type. The auto-tagging classifier 812 may comprise multiple classifiers. The target image 850 may be tagged with a class for each tag type that has the highest probability or confidence value. In an example, the target image 850 may be applied to the CNNs 120 and 121 to determine attributes of the target image 850. The CNNs 121 may include the auto-tagging classifier 812 or another classifier that can classify for one or more tag types.

At 1303, the system 800 determines an initial set of matching images, such as the matching images 143a. The initial set of matching images (e.g., the matching images 143a) may be determined by comparing the attributes of the target image 850 determined at step 1302 to attributes of images stored in the data repository 175. In an example, the matching images 143a may be determined according to the similarity matching described with respect to steps 505-506 of the method 500. Also, the matching images 143a may be sent to the mobile application 842 via the network 119, which may prompt the user 840 to provide the supplemental user input 142.

At 1304, the system 800 receives the supplemental user input 142 via the network 119. For example, the user 840 may provide speech or text further explaining search criteria. The search criteria may be based on the target image 850 and/or an image of the matching images 143a.

At 1305, the system 800 applies the supplemental user input 142 to the NLP model 802 to determine at least one supplemental image search attribute. For example, the supplemental user input 142 may include the following speech "I wanna a same style shirt, but a green one". The speech may be converted to text, and the text is provided to the NLP model 802 to determine at least one supplemental image search attribute. In this example, the supplemental image search attribute may include green plaid.

In an example, the at least one supplemental image search attribute determined from the output of the NLP model 802 may be used as object attribute search criteria. Also, the system 800 may determine whether the at least one supplemental image search attribute is a modification to attributes of the target image 850 determined at 1302 or is an additional attribute. For example, the speech "but a green one" is determined to be a modification because the NLP model 802 recognizes "but" as a modifier to an existing attribute of the target image 850. The modified attribute is "green". The NLP model 802 may determine that the attributes of the target image 850 include red plaid, and modifies red plaid to green plaid for the image search. If the speech included "and Gucci brand" then the NLP model 802 may determine the at least one supplemental image search attribute is an additional attribute for the brand tag type in the Gucci class.

At 1306, the system 800 identifies a matching subset of the images (e.g., the matching images 143b) stored in the data repository 175 that match the target image 850 and the supplemental user input 142. For example, the attributes of the target image 850 and the at least one supplemental image search attribute are used to search the tags of the images in the matching images 143a and/or the images in the data repository 175 to identify the matching images 143b.

At 1307, the matching images 143b may be transmitted to the mobile application 842 via the network 119. Then, the user 840 may view the matching subset of images to the mobile application for display by the mobile application. The system 800 may transmit the matching images 143b to the mobile device 841, and the mobile application 842 may display the matching images 143b. The method 1300 may be repeated any number of times. For example, the user 840 may provide additional supplemental user input after viewing the matching images 143b, and the system 800 may determine a new set of matching images from the matching images 143b and the additional supplemental user input for transmission to the mobile device 841.

What has been described and illustrated herein are examples of the disclosure along with some variations. The terms, descriptions and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

What is claimed is:

1. A machine learning image processing system comprising:
   a data repository storing images and tags for each image, wherein the tags for each image describe attributes of an object in each image;
   a network interface to connect the machine learning image processing system to at least one network;
   at least one processor to execute machine readable instructions stored on at least one non-transitory computer readable medium;
   at least one data storage to store a plurality of image attribute machine learning classifiers, wherein the plurality of image attribute machine learning classifiers comprise convolutional neural networks trained to identify the attributes;
   wherein the machine readable instructions comprise machine readable instructions for an auto-tagging subsystem, and the at least one processor is to execute the machine readable instructions for the auto-tagging subsystem to:
      apply each image stored in the data repository to the plurality of image attribute machine learning classifiers;
   determine predictions for a plurality of image attribute categories from outputs of the plurality of image attribute machine learning classifiers;
   determine the attributes of the object in each image stored in the data repository from the predictions; and
   tag each image stored in the data repository with the determined attributes for the object in each image,
   wherein the machine readable instructions comprise machine readable instructions for an image matching subsystem, and the at least one processor is to execute the machine readable instructions for the image matching subsystem to:
      receive, via the network interface, a target image from a mobile application connected to the machine learning image processing system via the at least one network;
      receive, via the network interface, supplemental user input associated with the target image from the mobile application connected to the machine learning image processing system via the at least one network;
      apply the target image to the plurality of image attribute machine learning classifiers;
      determine predictions for the plurality of image attribute categories from applying the target image to the plurality of image attribute machine learning classifiers;
      determine target image attributes for an object in the target image from the predictions determined by the plurality of image attribute machine learning classifiers;
      apply the supplemental user input to a natural language processing model to determine at least one supplemental image search attribute;
      identify a matching subset of the images stored in the data repository that match the target image based on image search attributes determined from the target image attributes and the at least one supplemental image search attribute; and transmit, via the network interface, the matching subset of images to the mobile application for display by the mobile application.

2. The machine learning image processing system of claim 1, wherein to determine the image search attributes determined from the target image attributes and the at least one supplemental image search attribute, the at least one processor is to:
   determine object attribute search criteria from applying the supplemental user input to the natural language processing model;
   determine whether the object attribute search criteria comprise a modification to the target image attributes or an additional image attribute;
   in response to determining the object attribute search criteria comprises the modification to the target image attributes:
      create the at least one supplemental image search attribute by modifying at least one of the target image attributes according to the object attribute search criteria; and
      determine the image search attributes from the modified at least one of the target image attribute and the target image attributes that are not modified;
   in response to determining the object attribute search criteria comprises the additional image attribute, determine the image search attributes from the additional image attribute and the target image attributes.

3. The machine learning image processing system of claim 1, wherein to identify a matching subset of the images stored in the data repository that match the target image based on image search attributes determined from the target image attributes and the at least one supplemental image search attribute the at least one processor is to:
   execute a similarity matching between the target image and the images stored in the data repository to identify a first subset of matching images; and
   determine, from the first subset of matching images, the matching subset of the images according to the at least one supplemental image search attribute.

4. The machine learning image processing system of claim 3, wherein to determine, from the first subset of matching images, the matching subset of the images according to the at least one supplemental image search attribute, the at least one processor is to:
   search the first subset of matching images for a second subset of images that have the at least one supplemental image search attribute to identify the matching subset of the images stored in the data repository.

5. The machine learning image processing system of claim 1, wherein the at least one processor is to execute the machine readable instructions for the image matching subsystem to:
   determine similarities between the target image attributes and attributes of images stored in the data repository; and
   identify an initial subset of matching images from the data repository based on the similarities, and
   wherein to identify a matching subset of the images comprises identifying the matching subset of the images based on the initial subset of matching images and the at least one supplemental image search attribute.

6. The machine learning image processing system of claim 5, determine similarities between the target image attributes and attributes of images stored in the data repository, the at least one processor is to:

determine hamming distances between the target image attributes and the attributes of the images stored in the data repository; and select at least one of the images stored in the data repository based on the determined hamming distances.

7. The machine learning image processing system of claim 1, wherein to determine predictions for a plurality of image attribute categories, the at least one processor is to:
determine the predictions from an output of a softmax layer of each of the plurality of image attribute machine learning classifiers.

8. The machine learning image processing system of claim 7, wherein a confidence value is determined from the output of the softmax layer, the confidence value indicating an accuracy of a prediction by one of the plurality of image attribute machine learning classifiers for each of a plurality of classes.

9. The machine learning image processing system of claim 8, wherein at least one of the tags are determined according to the confidence value.

10. The machine learning image processing system of claim 1, wherein the at least one processor is to:
generate the plurality of image attribute machine learning classifiers from training sets for each class of a plurality of classes of objects.

11. The machine learning image processing system of claim 1, wherein the supplemental user input comprises speech or text provided by a user.

12. A visual recommendation system comprising:
a data repository storing images, wherein the stored images include meta data comprised of tags describing attributes of the stored images, and wherein the tags are determined from applying the stored images to a plurality of image attribute machine learning classifiers classifying the stored images in classes for the tags;
at least one processor to:
receive a digital image of an object of interest to a user;
apply the digital image to a first machine learning classifier to identify the object;
apply the digital image of the object to a second machine learning classifier to determine attributes of the image of the object;
determine an initial subset of images stored in the data repository that are visually similar to the digital image of the object based on a comparison of the attributes of the digital image of the object and the attributes of the stored images;
receive supplemental user input associated with the initial subset of images and the object;
apply the supplemental user input to a natural language processing model to determine at least one supplemental image search attribute;
determine object search criteria from the at least one supplemental image search attribute and at least one of the attributes of the digital image of the object and attributes of the initial subset of images;
search the tags in the meta data of the stored images according to the object search criteria to identify a matching subset of the images stored in the data repository; and transmit visual recommendations for the object to a device via a network, wherein the visual recommendations comprise the matching subset of images.

13. The visual recommendation system of claim 12, wherein the stored images comprise images of products, and the visual recommendations comprise images of a subset of the products associated with the object that have the at least one supplemental image search attribute.

14. The visual recommendation system of claim 13, wherein the tags comprise categories of attributes associated with the products.

15. The visual recommendation system of claim 12, wherein the digital image of the object is captured by a camera of the device, and is transmitted to the visual recommendation system from the device.

16. The visual recommendation system of claim 12, wherein the at least one supplemental image search attribute comprises a modification to one of the attributes of the image of the object.

17. The visual recommendation system of claim 12, wherein the at least one supplemental image search attribute comprises an additional image attribute further describing the object of interest to the user.

18. A mobile device comprising:
a camera;
a display;
a microphone;
at least one processor; and
a non-transitory computer readable storing machine readable instructions for a mobile application, wherein the at least one processor is to execute the machine readable instructions to:
cause the camera to capture an image of an object;
transmit, via a network interface, the image of the object to a machine learning image processing system,
wherein the machine learning image processing system stores images and meta data comprised of tags describing attributes of the stored images,
wherein the tags are determined from applying the stored images to a plurality of image attribute machine learning classifiers classifying the stored images in classes for the tags, and
wherein the attributes for the stored images are determined from the classes for the tags;
receive an initial subset of the stored images from the machine learning image processing system that are visually similar to the image of the object, wherein the machine learning image processing system determines the initial subset of the stored images based on a comparison of attributes of the image of the object and the attributes of the stored images;
display the initial subset of the stored images on the display;
receive, via the microphone, supplemental user speech input in response to displaying the initial subset of the stored images;
transmit the supplemental user speech input or text determined from the supplemental user speech input, via the network interface, to the machine learning image processing system,
wherein the machine learning image processing system applies the supplemental user speech input or the determined text to a natural language processing model to determine object search criteria, and identifies a matching subset of the stored images from the object search criteria and at least one of the attributes of the image of the object and the attributes of the initial subset of the stored images;
receive the matching subset of the stored images, via the network interface, from the machine learning image processing system; and display the matching subset of the stored images on the display.

19. The mobile device of claim 18, wherein the matching subset of the stored images comprise visual product recommendations associated with the object and the supplemental user speech input.

20. The mobile device of claim 18, wherein the supplemental user speech input describes attributes of an object desired for purchase by the user providing the supplemental user speech input.

* * * * *

UNITED STATES PATENT AND TRADEMARK OFFICE
CERTIFICATE OF CORRECTION

PATENT NO.        : 10,210,178 B2                                   Page 1 of 1
APPLICATION NO.   : 15/477684
DATED             : February 19, 2019
INVENTOR(S)       : Christian Souche et al.

It is certified that error appears in the above-identified patent and that said Letters Patent is hereby corrected as shown below:

On the Title Page

At Item (30), Foreign Application Priority Data "16290130" should be "16290130.0".

At Item (30), Foreign Application Priority Data "17290038" should be "17290038.3".

Signed and Sealed this
Second Day of April, 2019

Andrei Iancu
*Director of the United States Patent and Trademark Office*